United States Patent
Pan et al.

(10) Patent No.: US 6,785,431 B2
(45) Date of Patent: Aug. 31, 2004

(54) MINIATURE CIRCULATOR ARRAY DEVICES AND METHODS FOR MAKING THE SAME

(75) Inventors: Jing-Jong Pan, Milpitas, CA (US); Ming Zhou, San Jose, CA (US); Hong-Xi Zhang, San Jose, CA (US); Feng-Qing Zhou, San Jose, CA (US)

(73) Assignee: Lightwaves 2020, Inc., Milpitas, CA (US)

( * ) Notice: Subject to any disclaimer, the term of this patent is extended or adjusted under 35 U.S.C. 154(b) by 22 days.

(21) Appl. No.: 10/068,794

(22) Filed: Feb. 6, 2002

(65) Prior Publication Data

US 2003/0147578 A1 Aug. 7, 2003

(51) Int. Cl.[7] .................................................. G02B 6/00
(52) U.S. Cl. .............................. 385/11; 385/6; 385/15; 359/280; 359/282; 359/483; 359/484; 359/494; 359/495; 359/497; 372/703
(58) Field of Search ............................... 385/6, 11, 15; 359/280, 282, 483, 484, 494, 495, 497; 372/703

(56) References Cited

U.S. PATENT DOCUMENTS

| | | | | |
|---|---|---|---|---|
| 5,471,340 A | * | 11/1995 | Cheng et al. | 359/281 |
| 5,574,596 A | * | 11/1996 | Cheng | 359/484 |
| 5,872,878 A | * | 2/1999 | Bergmann | 385/15 |
| 5,936,768 A | * | 8/1999 | Oguma | 359/484 |
| 6,097,869 A | * | 8/2000 | Chang et al. | 385/126 |
| 6,212,008 B1 | * | 4/2001 | Xie et al. | 359/484 |
| 6,396,629 B1 | * | 5/2002 | Cao | 359/484 |
| 6,404,549 B1 | * | 6/2002 | Huang et al. | 359/484 |
| 6,441,961 B1 | * | 8/2002 | Hou et al. | 359/497 |
| 2003/0058536 A1 | * | 3/2003 | Huang et al. | 359/495 |

* cited by examiner

Primary Examiner—Akm Enayet Ullah
Assistant Examiner—Daniel Petkovsek
(74) Attorney, Agent, or Firm—Ritter, Lang & Kaplan LLP

(57) ABSTRACT

Miniature optical devices, including circulator array devices, are fabricated using thin film coating technology. A typical optical device according to the present invention includes a spatial walkoff plate (SWP) coupled on opposite ends to first and second polarization orientation elements. First and second polarization beam splitter (PBS) elements are coupled to the first and second polarization orientation elements, respectively. The PBS elements are formed using thin film coating techniques and each includes an array of port coupling regions for coupling to an array of input/output fiber port assemblies. The SWP may be formed using thin film coating techniques or cut from a birefringent single crystal. Each polarization orientation element includes a Faraday rotator element, and in some embodiments, each also includes a wave plate formed using thin film coating techniques. The Faraday rotator elements are periodically poled in some embodiments using selective poling techniques to create oppositely oriented (bi-directional) magnetic domains so that polarization rotations of 45° in both clockwise and counter-clockwise directions can be simultaneously achieved on the same magnetic garnet. Periodically etched half-wave plates are used in some embodiments. Depending on the orientation of the optical axes of the SWP and the first and second PBS elements, the constituents of each polarization orientation element are designed and oriented so that the circulator device achieves a circulating operation with optical signals at an input port, i, coupled to one PBS element being passed to an output port, i+1, coupled to the other PBS element in a non-reciprocal manner.

88 Claims, 22 Drawing Sheets

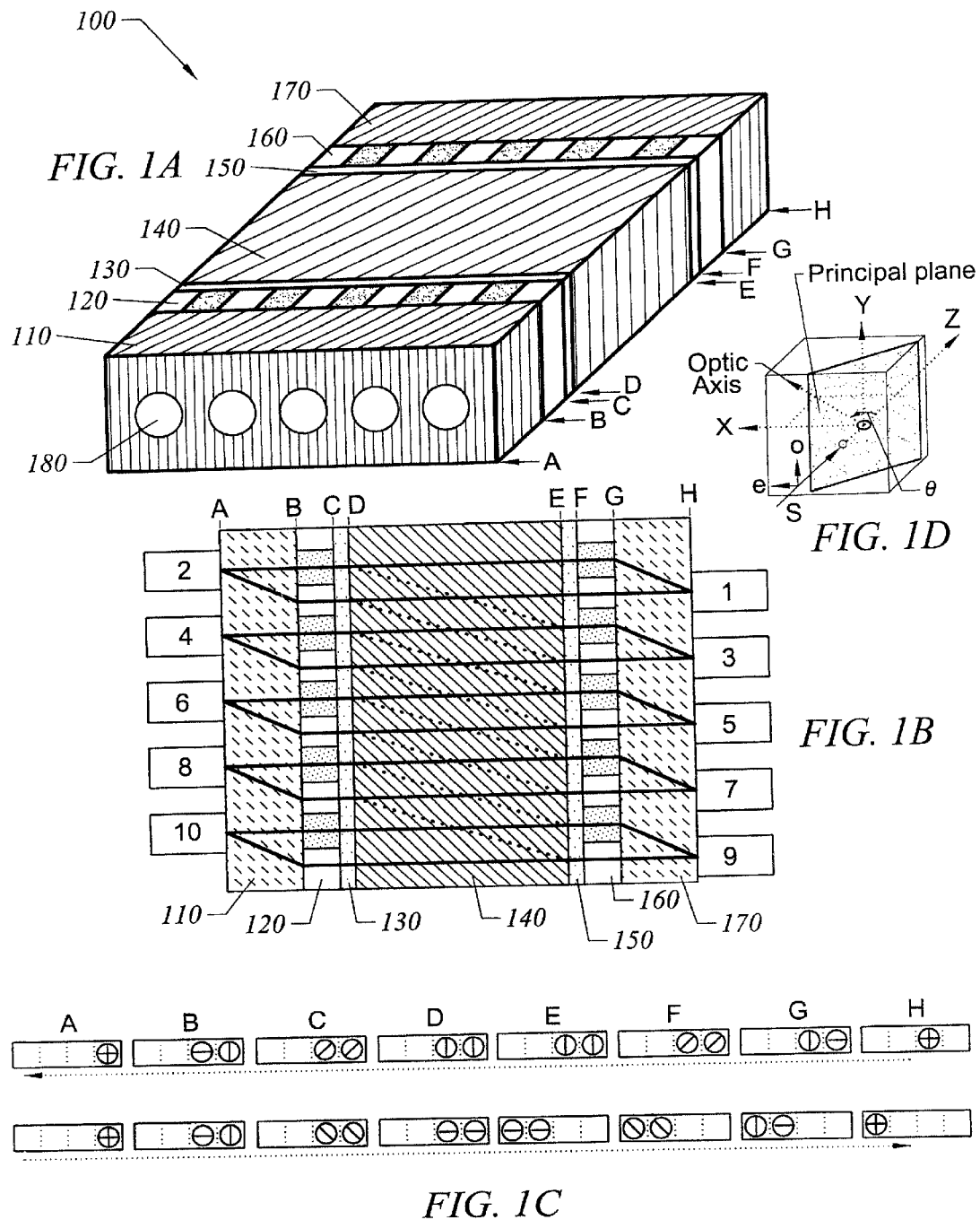

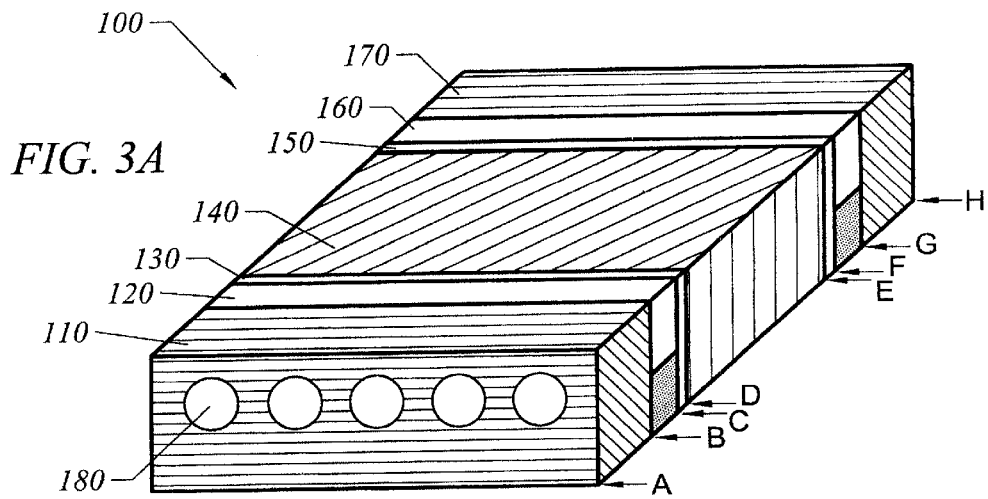
*FIG. 3A*
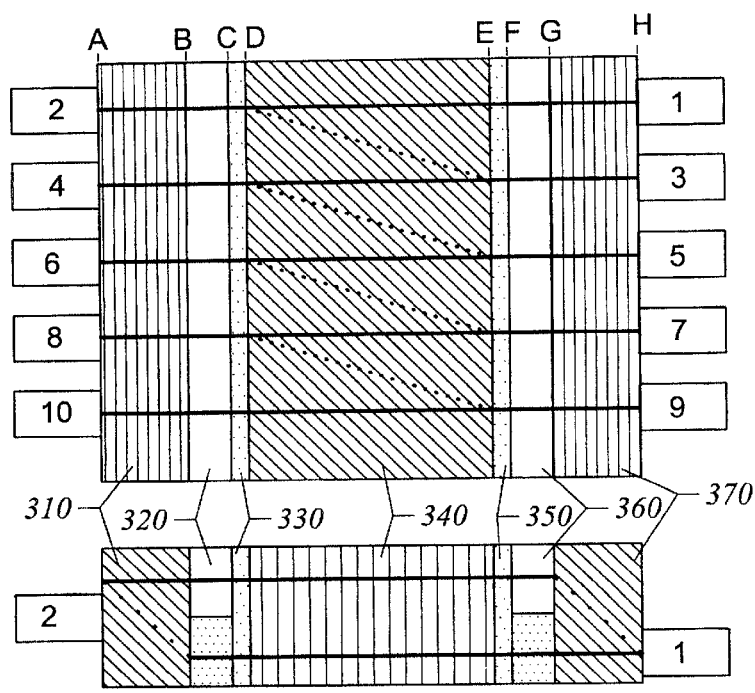
*FIG. 3B*
*FIG. 3C*
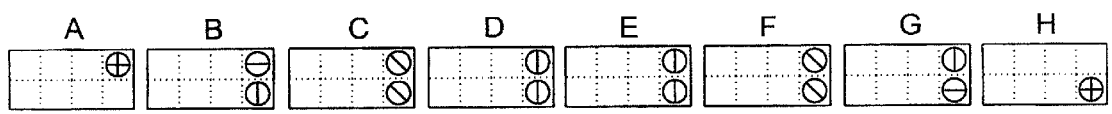
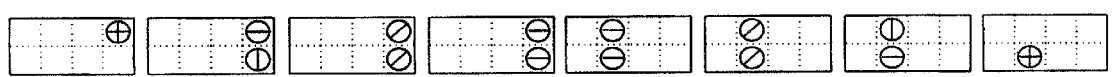
*FIG. 3D*

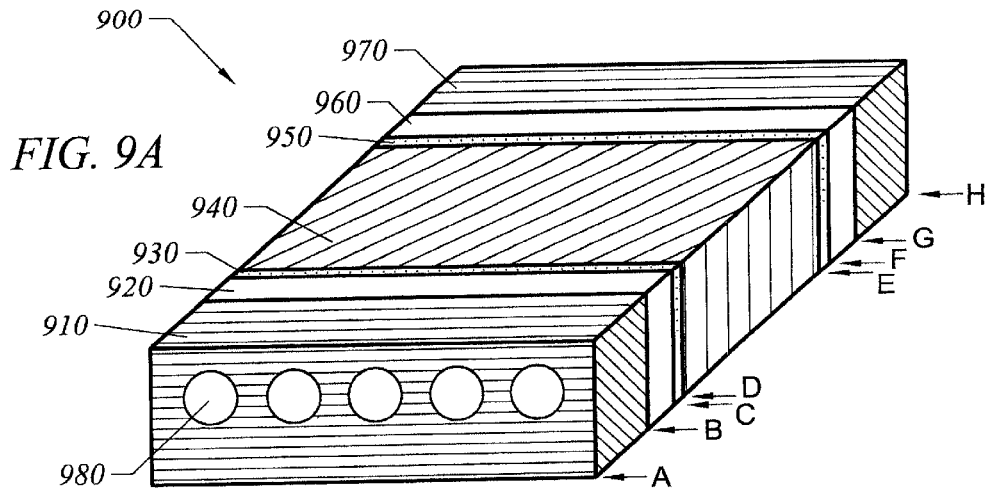
*FIG. 9A*
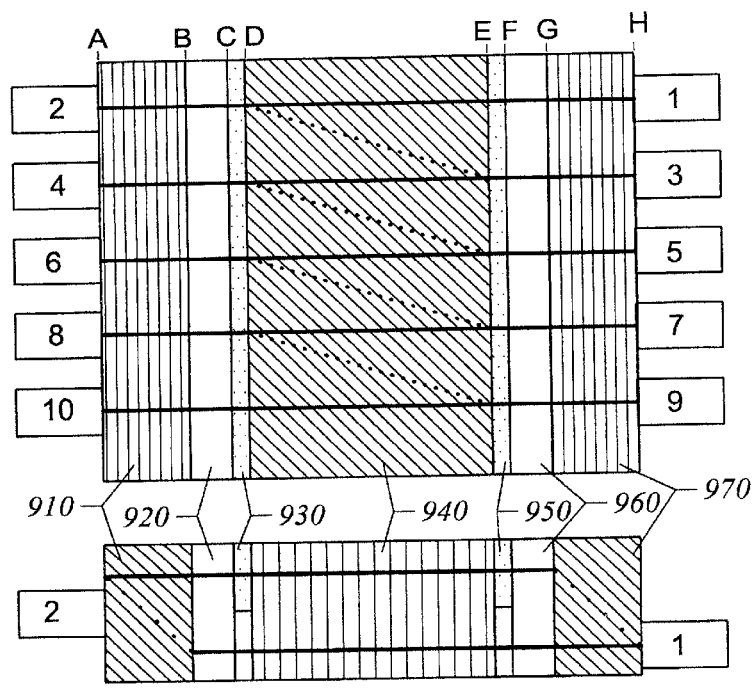
*FIG. 9B*
*FIG. 9C*
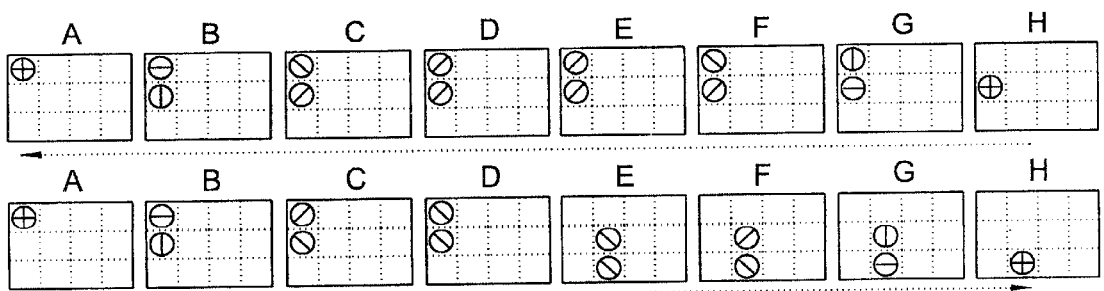
*FIG. 9D*

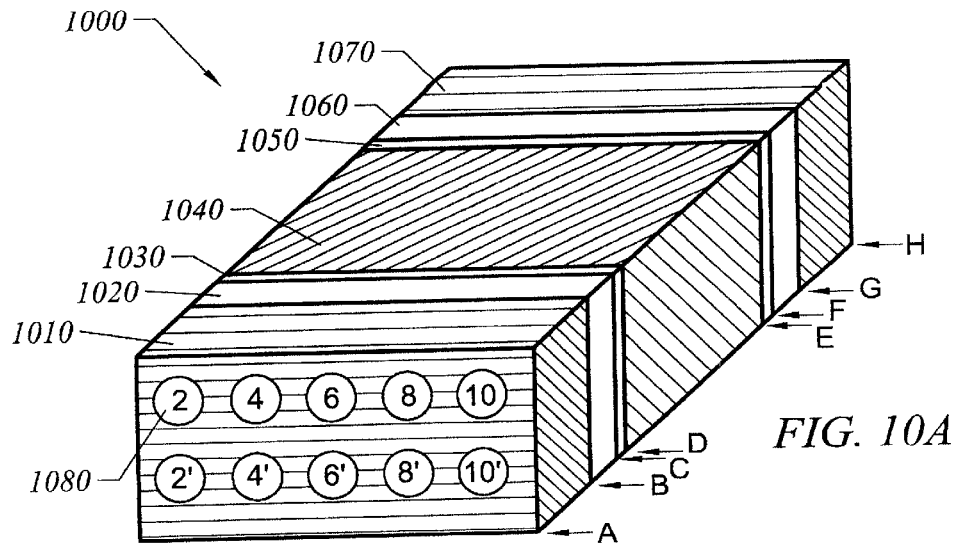
FIG. 10A
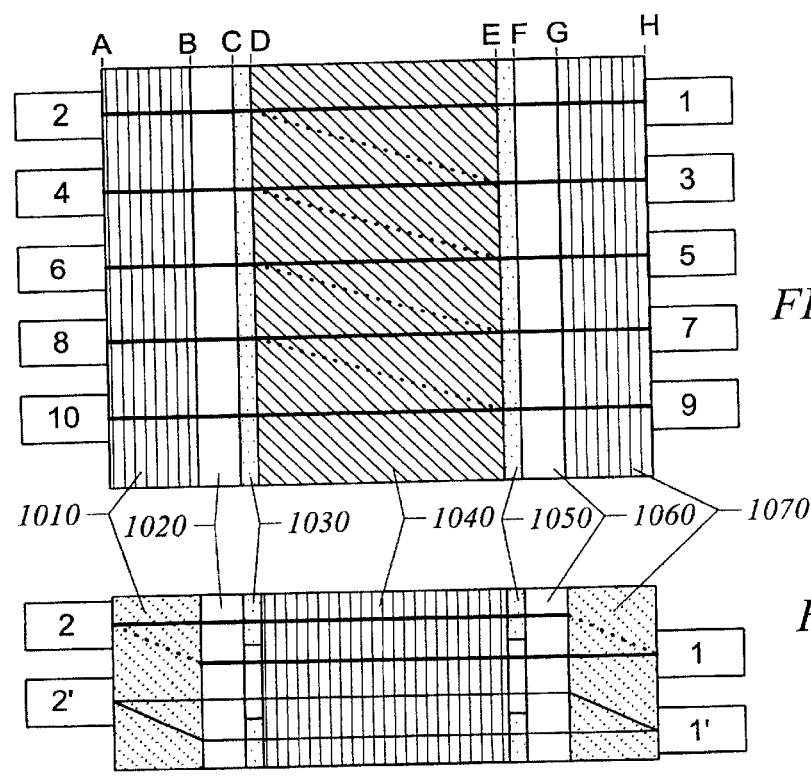
FIG. 10B
FIG. 10C
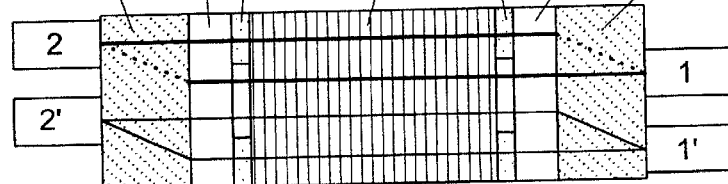

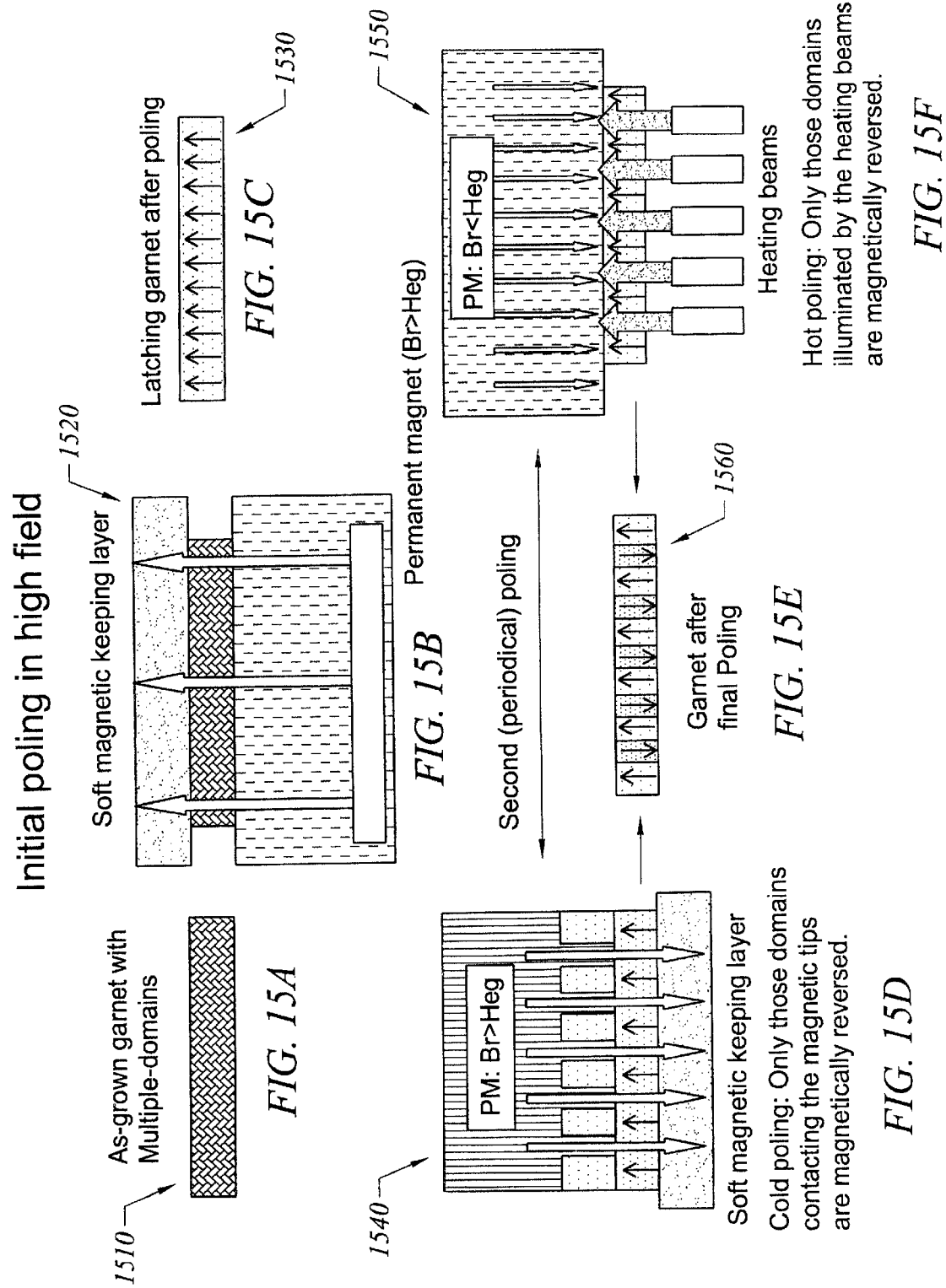

Magnetic (Periodic) Poling of Faraday Rotator

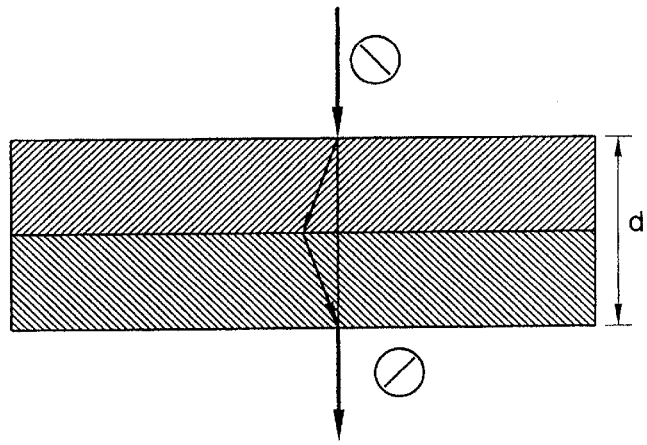
Waveplate from bi-directionally obliquely deposited films
Half wave plate : $\Delta n \cdot d = \lambda/2$
The half-wave plate is capable of rotating a linearly polarized light by 2 θ(where θ is the direction of polarization with respect to the optical axis before entering the wave plate).
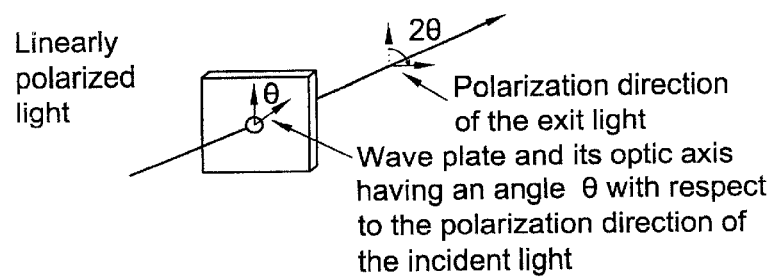
FIG. 17

MINIATURE CIRCULATOR ARRAY DEVICES AND METHODS FOR MAKING THE SAME

CROSS-REFERENCES TO RELATED APPLICATIONS

This application is related to U.S. patent application Ser. No. 10/068,796, filed concurrently herewith, entitled "MINIATURE CIRCULATOR DEVICES AND METHODS FOR MAKING THE SAME" (Attorney Docket No. 020858-001700), the disclosure of which is hereby incorporated by reference in its entirety.

BACKGROUND OF THE INVENTION

The present invention relates in general to optical devices such as optical circulators and optical isolators, and more particularly to optical devices that can be configured as an optical circulator having three, four or any number of optical ports, or as an optical isolator having two optical ports.

As generally known, in an optical isolator, a signal in the forward direction is passed from a first optical port to a second optical port. An optical circulator is a non-reciprocal optical device which allows the passage of light from a first optical port to a second one (as in an optical isolator), while a reverse signal into the second port is totally transmitted to a third port and so on for the remaining port(s) for a so-called circulating operation. Any two consecutive ports of an optical circulator are, in effect, an optical isolator since signals travel only one way.

Optical circulator devices play key roles in fiber optical networking systems and devices, for example, in fiberoptic amplifiers, dense wavelength division multiplexing (DWDM) systems and components and optical add-drop module (OADM) components. Several types of optical circulators have been developed. Examples of current optical circulator devices include those disclosed in U.S. Pat. Nos. 5,204,771; 5,471,340; 5,872,878; 6,002,512; 6,064,522 and 6,052,228. However, manufacturing such conventional circulator devices typically requires precise alignment of each optical element, leading to a low yield and high production costs. Furthermore, such conventional circulator devices tend to be bulky and expensive.

It is, therefore, desirable to provide a compact circulator array that is cost-effective and easily manufactured, and which is capable of routing any number of input signals within one integrated circulating module. It is also desirable that an optical circulator module have optimum performance, i.e., very high isolation, very low polarization dependent loss (PDL), very low polarization mode dispersion (PMD), low insertion loss, very low cross-talk, and high power handling capability. An optical circulator should also be designed for mass production with simple assembly processes.

The present invention avoids many of the problems above and substantially achieves an optical circulator or isolator which has a very high performance and which is easily manufactured. The present invention presents optical devices which are useful for long distance and high data rate communication systems.

SUMMARY OF THE INVENTION

The present invention provides optical isolator and circulator devices, and methods for making the same, having two optical ports in isolator embodiments and three, four or any number of optical ports in circulator embodiments.

According to embodiments of the present invention, miniature optical devices, including circulator array devices, are fabricated using thin film coating technology. A typical optical device according to the present invention includes a spatial walkoff plate (SWP), or other birefringent element, coupled on opposite ends to first and second polarization orientation elements. First and second polarization beam splitter (PBS) elements are coupled to the first and second polarization orientation elements, respectively. The PBS elements are formed using thin film coating techniques and each includes an array of port coupling regions for coupling to an array of input/output fiber port assemblies. The SWP may be formed using thin film coating techniques or cut from a birefringent single crystal. Each polarization orientation element includes a Faraday rotator element, and in some embodiments, each also includes a half-wave plate formed using thin film coating techniques. The Faraday rotator elements are periodically poled in some embodiments using selective poling techniques to create oppositely oriented (bi-directional) magnetic domains so that polarization rotations of 45° in both clockwise and counterclockwise directions can be simultaneously achieved on the same magnetic garnet. Periodically etched half-wave plates are used in some embodiments. Depending on the orientation of the optical axes of the SWP and the first and second PBS elements, the constituents of each polarization orientation element are designed and oriented so that the circulator device achieves a circulating operation with optical signals at an input port, i, coupled to one PBS element being passed to an output port, i+1, coupled to the other PBS element in a non-reciprocal manner. In some embodiments, a reflective element replaces one of the PBS elements so as to provide a circulator device having a reflective operation, with an optical signal at an input port, i, coupled to the PBS element being passed to the next consecutive port, i+1, coupled to the PBS element.

According to an aspect of the present invention, an optical device for coupling arrays of optical fiber ports is provided. The device typically comprises a birefringent element arranged so that light traveling parallel to a propagation axis and having a first linear polarization orientation passes through parallel to the propagation axis and light traveling parallel to the propagation axis and having a second linear polarization orientation perpendicular to the first polarization orientation is deflected at an angle relative to the propagation axis. the device also typically comprises first and second polarization orientation elements coupled to opposite ends of the birefringent element, and first and second polarization beam splitting (PBS) films deposited on said first and second polarization orientation elements, respectively, wherein the end face of each of the first and second PBS films opposite the polarization orientation elements defines an array of two or more port coupling regions for coupling light signals from an array of two or more optical fiber ports, with one PBS film defining even numbered ports and the other defining odd numbered ports, wherein the first and second PBS films are dimensioned and arranged so as to split a light signal in a forward direction into two parallel beams of light linearly polarized perpendicular to each other, and to combine parallel beams of light linearly polarized perpendicularly to each other in the reverse direction into a single beam of light. The first polarization orientation element is typically arranged with respect to the birefringent element and the first PBS film so as to orient the polarization of both of the parallel light beams of a first optical signal propagating along a forward direction from a first port coupling region on the first PBS film parallel to the first linear polarization orientation so that both beams simultaneously pass through the birefringent element parallel to the propagation axis, and to orient the polarization of two beams linearly polarized parallel to each other propagating in the reverse direction so that they are polarized perpendicular to each other. Additionally, the second polarization orientation element is typically arranged with respect to the birefringent element and the second PBS film so as to orient the polarization of both of the parallel light beams of a second optical signal propagating along a forward direction from a second port coupling region on the second PBS film parallel to the second linear polarization orientation so that both beams are simultaneously deflected in the birefringent element, and to orient the polarization of two beams linearly polarized parallel to each other propagating in the reverse direction so that they are mutually perpendicular.

According to another aspect of the present invention, an optical device for coupling an array of optical fiber ports is provided. The device typically comprises a birefringent element arranged so that light traveling parallel to a propagation axis and having a first linear polarization orientation passes through parallel to the propagation axis, and light traveling parallel to the propagation axis and having a second linear polarization orientation perpendicular to the first polarization orientation is deflected at an angle relative to the propagation axis. The device also typically comprises first and second polarization orientation elements coupled to opposite ends of the birefringent element, and a polarization beam splitting (PBS) film deposited on said first polarization orientation element, wherein the end face of the PBS film opposite the first polarization orientation element defines an array of two or more port coupling regions for coupling light signals from an array of two or more optical fiber ports, wherein the PBS film is dimensioned and arranged so as to split a light signal in a forward direction into two parallel beams of light linearly polarized perpendicular to each other, and to combine parallel beams of light linearly polarized perpendicularly to each other in the reverse direction into a single beam of light. The device also typically comprises a reflection element coupled to the second polarization orientation element opposite the birefringent element, wherein the reflection element is arranged such that the beam components of a light signal propagating in the forward direction are reflected back in the reverse direction. The first polarization orientation element is typically arranged with respect to the birefringent element and the PBS film so as to orient the polarization of both of the parallel light beams of a first optical signal propagating along a forward direction from a first port coupling region parallel to the second linear polarization orientation so that both beams are simultaneously deflected in the birefringent element, and to orient the polarization of two beams linearly polarized parallel to each other propagating in the reverse direction so that they are polarized perpendicular to each other. The second polarization orientation element typically arranged so as to rotate the polarization state of each of the parallel light beams of the first optical signal propagating along the forward direction by 45° in one direction, wherein the second polarization orientation element rotates, by 45° in the same direction, the polarization state of both of the parallel light beams of the first optical signal propagating along the reverse direction after being reflected by the reflection element such that both beams are parallel to the first linear polarization orientation, and such that both beams simultaneously pass through the birefringent element parallel to the propagation axis in the reverse direction According to yet another aspect of the present invention, a method is provided for forming an optical device for coupling arrays of optical fiber ports. The method typically comprises providing a birefringent element, wherein light traveling within the birefringent element parallel to a propagation axis and having a first linear polarization orientation passes through parallel to the propagation axis, and light traveling parallel to the propagation axis and having a second linear polarization orientation perpendicular to the first polarization orientation is deflected at an angle relative to the propagation axis, and attaching first and second polarization beam splitting (PBS) modules on opposite ends of the birefringent element, wherein each module includes a PBS film deposited on a polarization orientation element, with said polarization orientation elements being attached to the opposite ends of the birefringent element. The end face of each of the first and second PBS films opposite the polarization orientation elements defines an array of two or more port coupling regions for coupling light signals from an array of two or more optical fiber ports, with one PBS film defining even numbered ports and the other defining odd numbered ports. The first and second PBS films are typically dimensioned and arranged so as to split a light signal in a forward direction into two parallel beams of light linearly polarized perpendicular to each other, and to combine parallel beams of light linearly polarized perpendicularly to each other in the reverse direction into a single beam of light. The first PBS module is typically arranged with respect to the birefringent element such that the first polarization orientation element orients the polarization of both of the parallel light beams of a first optical signal propagating along a forward direction from a first port coupling region on the first PBS film parallel to the first linear polarization orientation so that both beams simultaneously pass through the birefringent element parallel to the propagation axis, and such that the first polarization orientation element orients the polarization of two beams linearly polarized parallel to each other propagating in the reverse direction so that they are polarized perpendicular to each other, and wherein the first polarization orientation element refracts the light deflected by the birefringent element parallel to the propagation axis. The second PBS module is typically arranged with respect to the birefringent element such that the second polarization orientation element orients the polarization of both of the parallel light beams of a second optical signal propagating along a forward direction from a second port coupling region on the second PBS film parallel to the second linear polarization orientation so that both beams are simultaneously deflected in the birefringent element, and such that the second polarization orientation element orients the polarization of two beams linearly polarized parallel to each other propagating in the reverse direction so that they are mutually perpendicular.

According to yet a further aspect of the present invention, a method is provided for forming an optical device for coupling an array of three or more optical fiber ports. The method typically comprises providing a birefringent element, wherein light traveling within the birefringent element parallel to a propagation axis and having a first linear polarization orientation passes through parallel to the propagation axis, and light traveling parallel to the propagation axis and having a second linear polarization orientation perpendicular to the first polarization orientation is deflected at an angle relative to the propagation axis, and attaching a polarization beam splitting (PBS) module on one end of the birefringent element, wherein the PBS module includes a PBS film deposited on a polarization orientation element, wherein the end face of the PBS film opposite the polarization orientation element defines an array of three or more port coupling regions for coupling light signals from an array of three or more optical fiber ports, and wherein the PBS film is dimensioned and arranged so as to split a light signal in a forward direction into two parallel beams of light linearly polarized perpendicular to each other, and to combine parallel beams of light linearly polarized perpendicularly to each other in the reverse direction into a single beam of light. The method also typically includes attaching a reflection module on the other end of the birefringent element opposite the PBS module, wherein the reflection module includes a reflection element coupled to a Faraday rotator element. The PBS module is typically arranged with respect to the birefringent element such that the polarization orientation element orients the polarization of both of the parallel light beams of an optical signal propagating along a forward direction from a first port coupling region on the PBS film parallel to the second linear polarization orientation so that both beams are simultaneously deflected in the birefringent element, and such that the polarization orientation element orients the polarization of two beams linearly polarized parallel to each other propagating in the reverse direction so that they are polarized perpendicular to each other. The reflection module is typically arranged with respect to the birefringent element such that the Faraday rotator element rotates the polarization of both of the parallel light beams of the optical signal propagating along the forward direction by 45° in one direction and rotates, by 45° in the same direction, the polarization state of both of the parallel light beams of the optical signal propagating along the reverse direction after reflection by the reflection element such that both beams are parallel to the first linear polarization orientation, and such that both beams simultaneously pass through the birefringent element parallel to the propagation axis in the reverse direction.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

FIG. 1A is an isometric view diagram showing the structure of a multiple-port circulator device according to an embodiment of the present invention; FIG. 1B is a top view showing the structure and operation of the multiple-port circulator device of FIG. 1A; FIG. 1C is a state diagram showing the polarization and position of beam(s) at different locations between two sets of consecutive ports of the multiple-port circulator device of FIGS. 1A and 1B; FIG. 1D illustrates the orientation of the optical axes and principal planes of the SWP and PBS elements of FIG. 1A relative to the light propagation direction (Z-axis) according to an embodiment of the present invention;

FIGS. 3A–3D illustrate by way of an isometric view, a top view, a side view and a polarization state diagram, respectively, the structure and operation of another multiple-port circulator device according to an embodiment of the present invention;

FIGS. 9A–9D illustrate by way of an isometric view, a top view, a side view, and a polarization state diagram, respectively, the structure and operation of another multiple-port circulator device having uniformly poled Faraday rotator elements according to an embodiment of the present invention;

FIGS. 10A–10C illustrate by way of an isometric view, a top view, and a side view, respectively, the structure and operation of a multi-tiered, multiple-port circulator device according to an embodiment of the present invention;

FIG. 15 illustrates a magnetic processing methodology for obtaining the desired magnetic profile in a magnetic garnet according to an embodiment of the present invention.;

FIG. 17 illustrates a waveplate created from bi-directionally obliquely deposited thin films according to an embodiment of the present invention;

DESCRIPTION OF THE SPECIFIC EMBODIMENTS

Circulator Devices

Figure 2A:
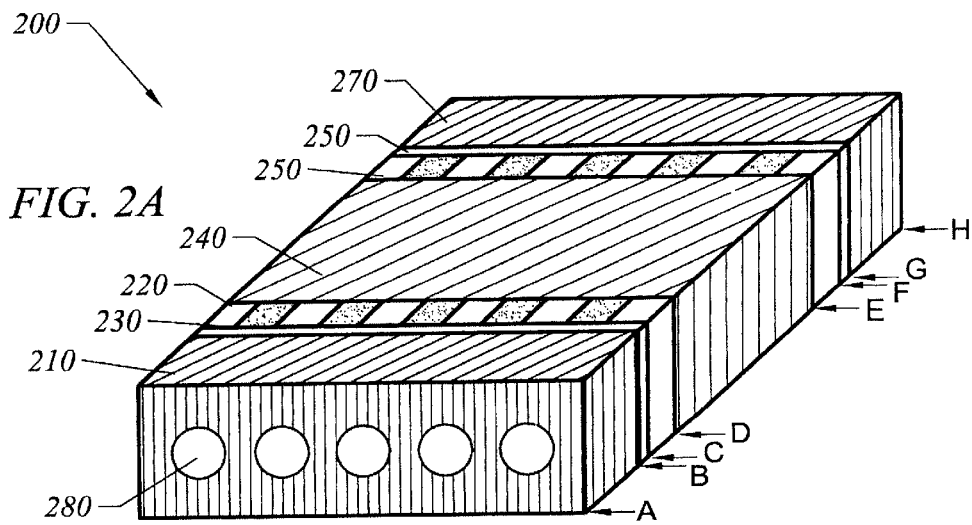
FIGS. 2A–2C illustrate by way of an isometric view, a top view, and a polarization state diagram, respectively, the structure and operation of another multiple-port circulator device according to an embodiment of the present invention.

FIGS. 1A–1C show the elements and operation of a multiple-port circulator device 100 according to an embodiment of the present invention. In FIG. 1A the multiple-port circulator device 100 includes polarization beam splitter (PBS) elements 110 and 170, periodically poled Faraday rotator elements 120 and 160 and half-wave plates 130 and 150 arranged on either side of a spatial walkoff plate (SWP) 140. Light signal pass to and from the circulator device 100 through port coupling regions 180 on the end face of PBS element 110 and on the end face of PBS element 170 (not shown). Each port coupling region 180 represents a coupling location for an optical port assembly. For example, as shown in the top view of FIG. 1B, ten optical port assemblies (ports) are arranged on the circulator device with consecutive ports on opposite sides of the circulator device 100. That is, ports 1, 3, 5, 7 and 9 are arranged on one side and ports 2, 4, 6, 8, and 10 are arranged on the opposite side. As explained below, light from port 1 passes to port 2, light from port 2 passes to port 3, light from port 3 passes to port 4, and so on, such that for an N-port circulator device, light from port N–1 passes to port N.

It should be appreciated that circulator device structures according to the present invention, including the circulator device 100, may be extended in size such that any number of optical port assemblies may be attached thereto. For example, practical circulator device embodiments including 40 or more, and even 100 or more optical port assemblies coupled thereto are readily produced and implemented using the teachings of the present invention. Further, it should be appreciated that the circulator device structures according to the present invention, including the circulator device 100, may be reduced in size such as to accommodate only three or four optical port assemblies, or only two in isolator embodiments.

Each optical port assembly is nearly identical to the others. In one embodiment, a multisection fiber collimator assembly is used to couple an array of fibers to the devices of the present invention. One example of such a multisection collimator assembly is discussed in U.S. Pat. No. 6,014,486, the disclosure of which is hereby incorporated by reference in its entirety for all purposes. As shown in one embodiment therein, for example, a multisection collimator includes an array of multimode graded index fiber sections bonded to an array of silica (e.g., step index) fiber sections. An array of single mode fibers may be bonded to either or both of the silica and graded index sections.

Each of the PBS elements 110 and 170 divides a light beam having an arbitrary state of polarization received from each coupled port in the forward direction into two linearly polarized components with mutually perpendicular polarization states, and combines two mutually perpendicular polarized components in the reverse direction. In general, these components are typically referred to as the e-(extraordinary) and o-(ordinary) beams. Each PBS (and the SWP) has a principal plane in which the optic axis lies and in which the divided e- and o-beams travel. In general, the o-beam is defined as being polarized perpendicular to the principal plane and is unrefracted and maintains its propagation direction, while the e-beam is defined as being polarized parallel to the principal plane and is refracted by an angle, $\delta$. According to the present embodiment as shown in FIGS. 1A–1D, for example, the PBS elements 110 and 170 and SWP 140 are each arranged so that their principal planes are parallel to the x-z plane (plane of FIG. 1B) where the direction of propagation of an incoming light signal is along the z-axis. As shown in FIG. 1D, the optic axis of each lies in the x-z plane at an angle, $\theta$, relative to the z-axis (and an angle ($\phi=90°$ relative to the y-axis). The shaded plane, which is perpendicular to the optic axis, shows the layer structure of the PBS and SWP elements as shown in FIG. 1A. For any light traveling perpendicular to the shaded plane, and parallel to the optic axis, there will be no birefringence. Thus, each of the PBS and SWP elements are arranged such that the e-beam is refracted along the principal plane with an x-component (horizontally relative to FIG. 1A; vertically relative to FIG. 1B), while the o-beam passes straight through along the z-direction. Unless stated otherwise, it will be assumed throughout this detailed description of specific embodiments that the direction of propagation of incoming light signals will be parallel to the z-axis.

Each of the Faraday rotator elements 120 and 160 rotates the state of polarization of a beam by a predetermined angle in a predetermined direction (e.g., 45° clockwise) regardless of the direction of the propagation of the beam, i.e., Faraday rotator elements are non-reciprocal. In the preferred embodiments of the present invention, the Faraday rotator elements, including Faraday rotator elements 120 and 160, include a magnetically saturated latched garnet film as described in more detail below. In these embodiments, the thickness and saturation magnetization are selected to obtain the desired rotation (e.g., 45°) of the plane of polarization of one or more pre-selected wavelengths. U.S. Pat. No. 5,801,875, which is hereby incorporated by reference in its entirety for all purposes, discusses various attributes and properties of latching garnet structures.

According to the present embodiment and as shown in FIGS. 1A and 1B, the Faraday rotator elements 120 and 160 are periodically poled (i.e., the magnetic domains of the magnetic garnet are periodically reversed as described in more detail below). Additionally, the Faraday rotator elements 120 and 160 are dimensioned so as to rotate the polarization of a beam by 45°. Thus, oppositely poled regions of the first Faraday rotator 120 encountered by the component beams of each light signal rotate the two mutually perpendicular states of polarization into the same polarization state. Similarly, the oppositely poled regions of the second Faraday rotator 160 encountered by the component beams rotate the two parallel states of polarization into mutually perpendicular states of polarization. That is, the divided components of each light signal are rotated by 45° in opposite directions by the periodically poled Faraday rotators 120 and 160.

The half-wave plate 150 is arranged such that the states of polarization of the complementary beams are rotated counterclockwise when the (divided) light signal is propagating from an odd-numbered port to an even-numbered port (right to left in FIG. 1C), and clockwise when the light signal is propagating in the reverse direction. Similarly, the half-wave plate 130 is arranged such that the states of polarization are rotated clockwise when the light signal is propagating from an odd-numbered port to an even-numbered port, and counterclockwise when the light signal is propagating in the reverse direction. Thus, the combination of each adjacent pair of Faraday rotator and half-wave plate elements operates to convert mutually perpendicular polarization components into components having parallel states of polarization in a desired orientation. Similarly, each adjacent pair of Faraday rotator and half-wave plate elements converts components having parallel polarization states into mutually perpendicular polarization states.

For example, according to the embodiment illustrated in FIGS. 1B and 1C, the periodically poled Faraday rotator 160 and half-wave plate 150 together operate to convert the components of a light signal from an odd-numbered port into parallel polarized components having a linear polarization orientation perpendicular to the principal plane of SWP 140 (state E in top portion of FIG. 1C), while the periodically poled Faraday rotator 120 and half-wave plate 130 together operate to convert the received parallel polarized components into mutually perpendicular states of polarization (state B in top portion of FIG. 1C). Similarly, the periodically poled Faraday rotator 120 and half-wave plate 130 together operate to convert the components of a light signal from an even-numbered port into parallel polarized components having a linear polarization orientation parallel to the principal plane of SWP 140 (state D in bottom portion of FIG. 1C), while the periodically poled Faraday rotator 160 and half-wave plate 150 together operate to convert the parallel polarized components into mutually perpendicular states of polarization (state G in bottom portion of FIG. 1C).

A SWP operates similarly to a PBS; that is, a SWP splits a light beam having an arbitrary state of polarization into two mutually perpendicular polarization components, with one maintaining the propagation direction, and the other being deflected along the principal plane. However, all elements of the circulator device 100 are preferably arranged such that the parallel polarized beam components for each light signal entering the SWP 140 both have a state of polarization oriented either parallel or perpendicular to the principal plane (x-z plane) of the SWP 140. Thus, depending on the relative orientation, both parallel polarized components of each light signal entering the SWP either simultaneously maintain the propagation direction or are simultaneously deflected. According to the present embodiment as shown in FIGS. 1A–1D, for example, the parallel polarized components of a light signal entering the SWP 140 from the direction of an odd-numbered port are oriented perpendicular to the principal plane of the SWP 140 (i.e., y-polarized) such that both components maintain the propagation direction, while the parallel polarized components of a light signal entering the SWP 140 from an even-numbered port are oriented parallel to the principal plane of the SWP 140 (i.e., x-polarized) such that both components are deflected along the principal plane.

In summary, the general operation of the circulator 100 of FIGS. 1A–1D is therefore as follows. A (collimated) light signal received from an odd-numbered optical port, say, optical port 1, is split into two linearly polarized beams by the PBS 170, with the e-beam (x-polarized) being refracted (upwards in FIG. 1B) and the o-beam (y-polarized) maintaining its propagation direction. The beams reach oppositely poled regions of the Faraday rotator plate 160 and are rotated by 45° in opposite directions so that the beams are linearly polarized parallel to each other. Each of the beams is then rotated another 45° in the same direction (counterclockwise in FIG. 11C) by the half-wave plate 150 so that each beam is polarized perpendicular to the principal plane of the SWP 140 (i.e., y-polarized). Thus, both beams pass through and are unrefracted by the SWP 140. The two parallel beams, polarized parallel to each other, reach half-wave plate 130 and are rotated 45° in the same direction (clockwise in FIG. 1C). Each of the beams, still linearly polarized parallel to each other, reach oppositely poled regions of the Faraday rotator element 120 and are rotated 45° in opposite directions so that the beams are linearly polarized perpendicular to each other. The beams enter PBS 110 and are combined back into one beam of light; the original o-beam is now an e-beam to the PBS 110 and is refracted (upwards in FIG. 1B) while the original e-beam is now an o-beam and maintains its propagation direction. The combined beam enters optical port 2 and is focused and/or collimated into a fiber, e.g., using a multisection fiber collimator assembly as discussed above, and ultimately passed to a coupled fiber. In this manner a light signal from an odd-numbered port (e.g., port 1) passes to the consecutive even-numbered port (e.g., port 2).

For a light signal originating from an even-numbered port, say, port 2, the light is split into two linearly polarized beams by the PBS 110, with the e-beam being refracted (downwards in FIG. 1*b*) and the o-beam maintaining its propagation direction. The beams reach oppositely poled regions of the Faraday rotator plate 120 and are rotated by 45° in opposite directions so that the beams are linearly polarized parallel to each other. Each of the beams is then rotated another 45° in the same direction (counterclockwise in FIG. 1C) by half-wave plate 130 so that each beam is polarized parallel to the principal plane of the SWP 140 (i.e., x-polarized). Thus, both beams are refracted by the SWP 140 (downwards in FIG. 1B). The two parallel beams, polarized parallel to each other, reach the half-wave plate 150 and are rotated 45° in the same direction (clockwise in FIG. 1C). Each of the beams, still linearly polarized parallel to each other, reach oppositely poled regions of the Faraday rotator element 160 and are rotated 45° in opposite directions so that the beams are linearly polarized perpendicular to each other. The beams enter the PBS 170 and are combined back into one beam of light; the original o-beam is now an e-beam to the PBS 170 and is refracted (downwards in FIG. 1B) while the original e-beam is now an o-beam and maintains its propagation direction. The combined beam enters optical port 3 and is focused and/or collimated into a fiber, e.g., using a multisection fiber collimator assembly as discussed above, and ultimately passed to a coupled fiber. In this manner, a light signal from an even-numbered port (e.g., port 2) passes to the consecutive odd-numbered port (e.g., port 3).

It should be appreciated that circulator devices according to the present invention have low polarization mode dispersion (PMD). PMD is typically measured in terms of a time delay between two polarization components of a light beam traveling between two points along different paths. Potential sources of PMD are the birefringent SWP 140 and the birefringent PBS elements 110 and 170 in the circulator 100. Each forward propagating beam is split into its mutually perpendicular o- and e-beam components, with the e-beam component being refracted and therefore traveling a slightly longer distance. However, the time delay created at the PBS coupled to an input port is compensated for at the PBS coupled to the output port. The e-beam at the input PBS becomes an o-beam at the output PBS, while the o-beam at the input PBS becomes an e-beam at the output PBS. Thus, with the same length and material of the two PBS elements, PMD is avoided. PMD is also avoided in the SWP 140 as the elements of the circulator are arranged such that no time delay between the components beams is introduced by the SWP; both components either simultaneously pass through or are simultaneously refracted by the SWP, thereby following substantially the same path length.

According to the present invention, the polarization beam splitters (PBSs) 110 and 170, and the spatial walk-off polarizer (SWP) 140, can be made using birefringent crystals, such as rutile, $YVO_4$, calcite, $LiNbO_3$ and others. However, it is preferred that each PBS element is made using a thin film coating technique with a tilted substrate assembly as described in more detail below. In such embodiments, the dimension of each PBS film along the z-axis is preferably between about 0.25 mm to about 0.5 mm and, more preferably, between about 0.25 mm to about 0.35 mm. For embodiments using PBS crystals, the dimension along the z axis is generally greater. For example, using a $YVO_4$ crystal, a dimension of approximately 1.25 mm is practical.

Each SWP element may also be made using the thin film coating technique, although it is preferred that a crystal of sufficient dimension be used. In such embodiments, the dimension along the z axis of the SWP crystal is preferably between about 1.0 mm and about 3.0 mm, although larger crystals may be used. For thin film embodiments, the dimension along the z axis of the SWP film is preferably greater than about 0.5 mm, although the dimension may be smaller. In general, the SWP defines the separation distance between the ports; that is, once the birefringent crystal is selected having a known birefringence, the angle of deviation of beams polarized parallel to the principal plane of the SWP is determined. Therefore, setting the thickness of the SWP (in FIG. 1, the distance between positions D and E) determines the distance between the ports on an end face. For example, with a thickness of SWP 140 on the order of approximately 2.5 mm, the ports on each end face of circulator device 100 would have a center-to-center spacing on the order of approximately 250 $\mu$m. In general, it is preferred to have a small center-to-center spacing, e.g., between about 100 $\mu$m and about 400 $\mu$m, to allow for more optical fibers to be coupled to the circulator devices without the device becoming bulky.

Figure 2B:
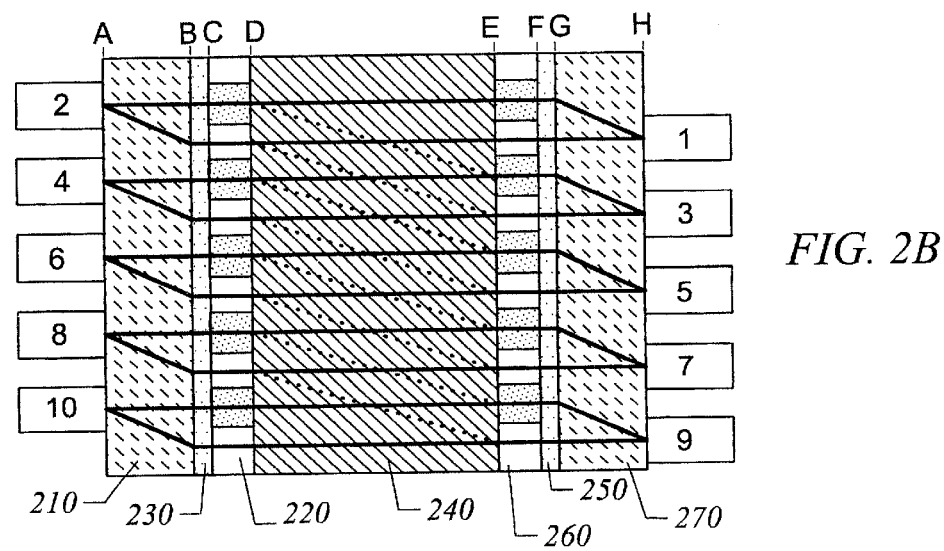
Figure 2C:
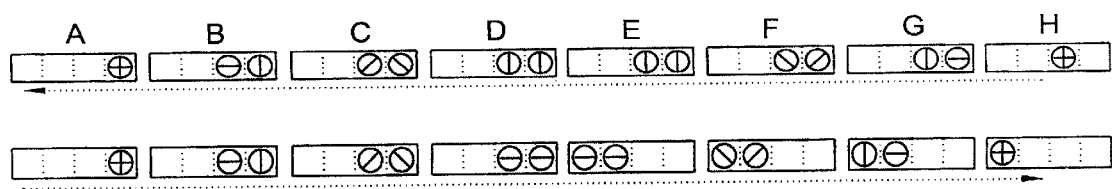

FIGS. 2A–2C show the elements and operation of another multiple-port circulator device 200 according to an embodiment of the present invention. The circulator device 200 includes PBS elements 210 and 270, Faraday rotator elements 220 and 260, half-wave plates 230 and 250, and a SWP 240, and is similar to the circulator device 100. For example, the PBS elements 210 and 270 and SWP 240 are each arranged such that their principal planes are each parallel to the x-z plane (plane of the drawing of FIG. 2B). In the circulator device 200, however, the relative positions of the half-wave plates and Faraday rotator elements are reversed. That is, in the circulator device 200 a forward z-propagating beam's components first encounter a half-wave plate and then a Faraday rotator element. Such a position reversal of the half-wave plates and Faraday rotator elements only affects the local polarization states of the component beams and does not change the general operation of the circulator device. For example, as shown in FIG. 2C, a beam's mutually perpendicular polarized components originating from an odd-numbered port first encounters the half-wave plate 250, which rotates both components by 45° in the counterclockwise direction (position F in top portion). The beam components, still mutually perpendicular to each other, then encounter the oppositely poled regions of the Faraday rotator element 260, which rotate the components by 45° in opposite directions such that they are polarized parallel to each other and perpendicular to the principal plane of the SWP 240 (position E in top portion). Thus, as with the embodiment in FIGS. 1A–1C, the combination of each adjacent pair of Faraday rotator and half-wave plate elements operates to convert mutually perpendicular polarization components into components having parallel states of polarization in a desired orientation. Similarly, each adjacent pair of Faraday rotator and half-wave plate elements converts components having parallel polarization states into mutually perpendicular polarization states.

FIGS. 3A–3D show the elements and operation of another multiple-port circulator device 300 according to an embodiment of the present invention. The circulator device 300 includes PBS elements 310 and 370, Faraday rotator elements 320 and 360, half-wave plates 330 and 350, and a SWP 340, and is similar to the circulator device 100. In the circulator device 300, however, the PBS elements 310 and 370 are both arranged such that their principal planes are parallel to the y-z plane (plane of the drawing of FIG. 3C, which shows a cross-sectional side view of the circulator device 300). Thus, for example, a forward z-propagating beam originating from an odd-numbered port is divided into components by the PBS 370, with one component being deflected with a y-component (in the vertical direction relative to FIG. 3C). The principal plane of the SWP 340, however, lies parallel to the x-z plane (plane of the drawing with reference to FIG. 3B). That is, the principal plane of the SWP 340 is orthogonal to the principal planes of each of the PBS elements 310 and 370, with the intersection being parallel to the z-axis. Thus, in operation, the PBS elements 310 and 370 operate to divide and recombine beam components along the y-z plane (in the vertical direction with respect to FIG. 3C), whereas the SWP 340 operates to walk off beam components along the x-z plane (in the vertical direction with respect to FIG. 3B).

Additionally, in the circulator embodiment of FIGS. 3A–3D, the Faraday rotator elements 320 and 360 each have only two oppositely poled regions. As shown in FIGS. 3A and 3C, the oppositely poled regions are horizontally divided (i.e., a horizontal boundary between the two regions). Such an arrangement is advantageous as it simplifies the process and equipment needed to produce the oppositely poled Faraday rotator elements as are described in more detail below. It is generally much simpler to fabricate two oppositely poled domains, rather than multiple oppositely poled domains.

Figure 4A:
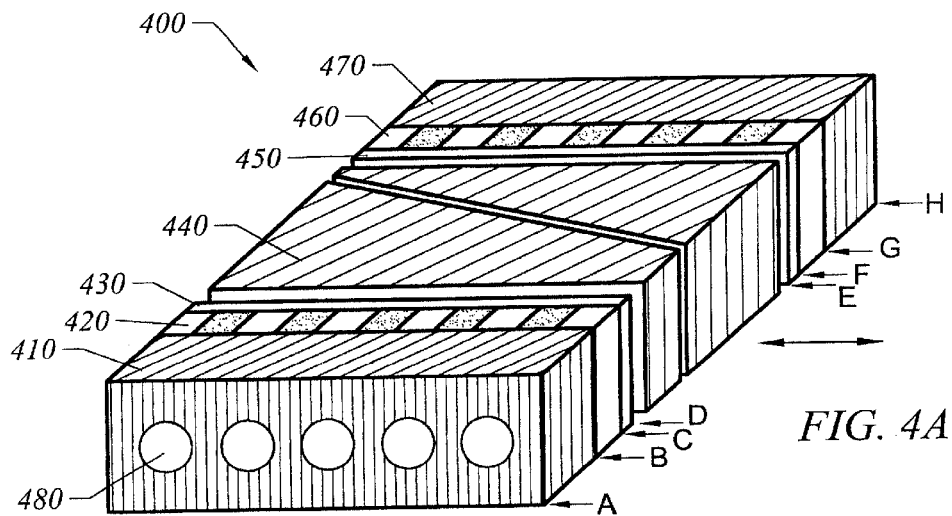
FIGS. 4A–4C illustrate by way of an isometric view, a top view, and a polarization state diagram, respectively, the structure and operation of another multiple-port circulator device having an adjustable SWP according to an embodiment of the present invention.
Figure 4B:
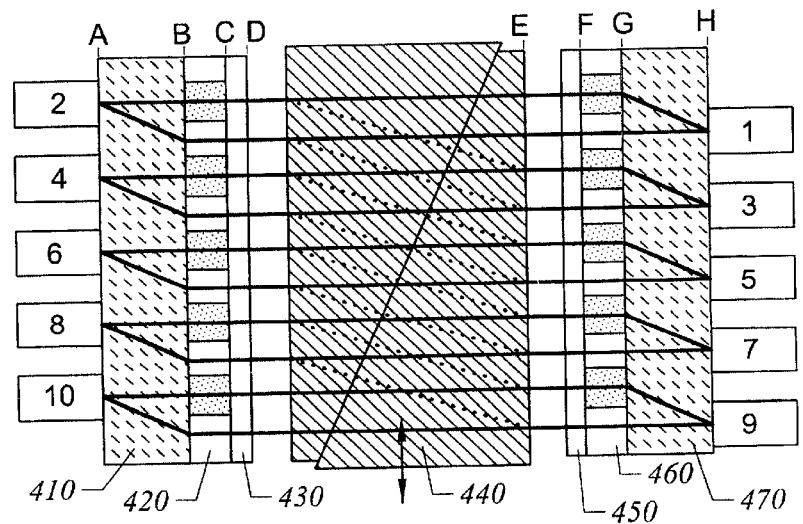
Figure 4C:
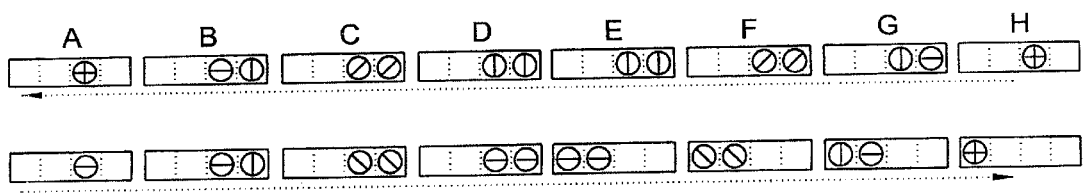

FIGS. 4A–4C show the elements and operation of another multiple-port circulator device 400 including an adjustable SWP 440 according to an embodiment of the present invention. As shown, the structure and operation of the circulator device 400 is nearly identical to that of the circulator device 100. PBS elements 410 and 470 and the SWP 440 are arranged such that their principal planes all lie parallel to the x-z plane (plane of the drawing of FIG. 4B). Additionally, periodically poled Faraday rotator elements 420 and 460, and half-wave plates 430 and 450 are arranged similarly to the same elements in FIGS. 1A–1C. Thus, the polarization state diagrams, FIGS. 1C and 4C, appear identical. According to the present embodiment, the thickness of the SWP 440 is adjustable. As shown in FIGS. 4A and 4B, a diagonal cut is made in the SWP 440 to allow for adjustment to the thickness by sliding one portion relative to the other in a vertical direction (relative to FIG. 4B). For example, if the right portion of the SWP 440 is moved upward (FIG. 4B), the thickness of SWP 440 is increased, whereas if the right portion is moved downward, the thickness is decreased. Because the center-to-center spacing between optical port assemblies on an end face depends on the thickness of the SWP 440, the present embodiment is particularly useful when it is desired to change, or fine tune, the center-to-center spacing of optical port assemblies. For example, the adjustable SWP of the present embodiment is useful for aligning input and output fiber arrays.

It should be appreciated that the use of an adjustable SWP is not limited to the present embodiment. Rather, an adjustable SWP can be implemented in any circulator device according to the present invention when changing or fine-tuning the lateral dimensions between the optical port assemblies is desired.

Figure 5A:
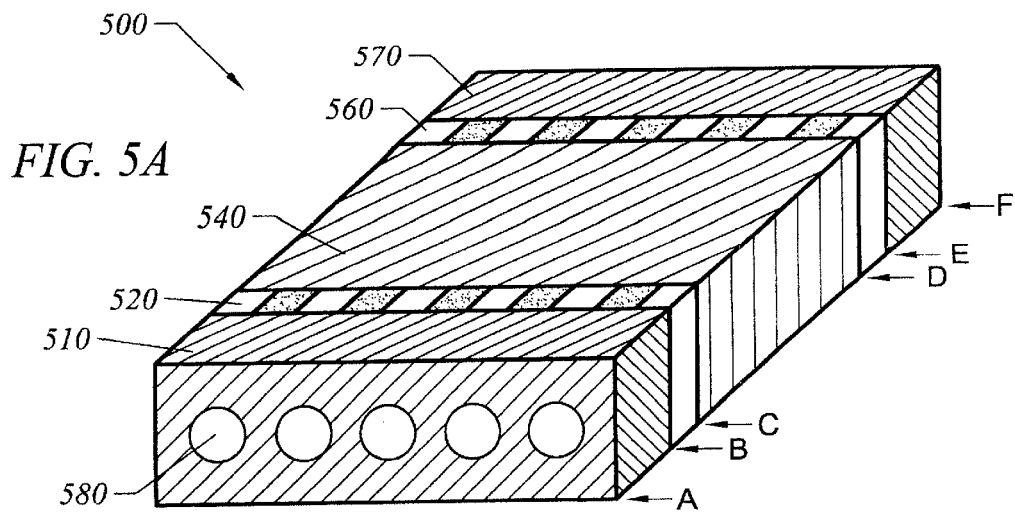
FIGS. 5A–5C illustrate by way of an isometric view, a top view, and a polarization state diagram, respectively, the structure and operation of another multiple-port circulator device according to an embodiment of the present invention.
Figure 5B:
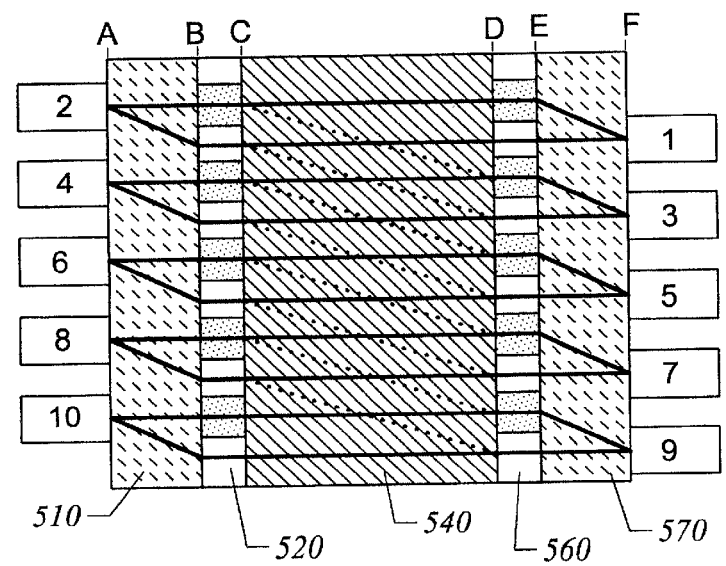
Figure 5C:
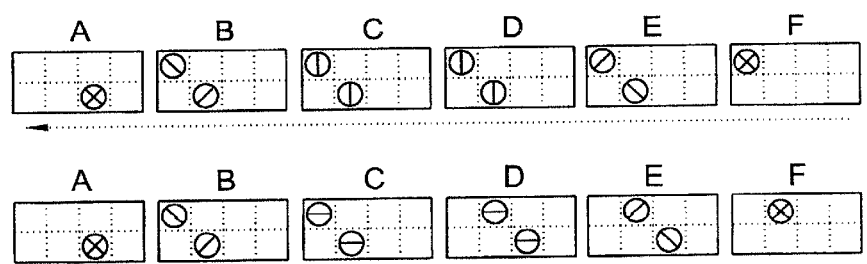

FIGS. 5A–5C show the elements and operation of another multiple-port circulator device 500 according to an embodiment of the present invention. The circulator device 500 includes PBS elements 510 and 570, Faraday rotator elements 520 and 560 and a SWP 540. It is noted that the circulator device 500 does not include any half-wave plates. Rather, the PBS element 510 is arranged such that its optic axis points in the direction of $\theta=45°$ relative to the z-axis and ($\phi=45°$ relative to the y-axis. Similarly, the PBS element 570 is arranged such that its optic axis points in the direction of $\theta=45°$ relative to the z-axis and ($\phi=135°$ relative to the y-axis. The SWP 540 is arranged such that its principal plane lies parallel to the x-z plane. When the mutually perpendicular e- and o-beam components of a light signal (in either the +z or −z direction) encounter the first Faraday rotator element, the polarization of each is oriented at a 45° angle with respect to the principal plane of the SWP 540. Therefore, rotation by the first encountered Faraday rotator element alone in opposite directions by 45° is sufficient to orient the polarization of the divided beams such that they are both parallel to or perpendicular to the principal plane of the SWP 540. Similarly, when the parallel polarized beam components emerge from the SWP 540, rotation by the second encountered Faraday rotator element in opposite directions by 45° is sufficient to orient the beams so that they are mutually perpendicular, with one component parallel to the principal plane of the output PBS element.

It should be noted that the polarization state diagram in FIG. 5C are slightly different from previous polarization state diagrams. The e-beam displacement is always in the principal plane of the birefringent crystal of a PBS. For this embodiment of the present invention, the principal planes of the PBS 510 and 570 are 45° relative to the vertical plane (y-z plane). Therefore, the e-beam displacement is in the principal plane, with angle $\theta=90°$ relative to the z-axis and $\phi=45°$ relative to the y-axis. The result is that the port coupling regions 580 on one end face are displaced along both the y- and x-directions relative to the port coupling regions 580 on the opposite end face by an amount determined by the thickness of both PBS elements 510 and 570 and of the SWP 540. The same is true for the polarization state diagrams of FIGS. 6C, 7C, 8C, 9D, 12C and 13C.

Figure 6A:
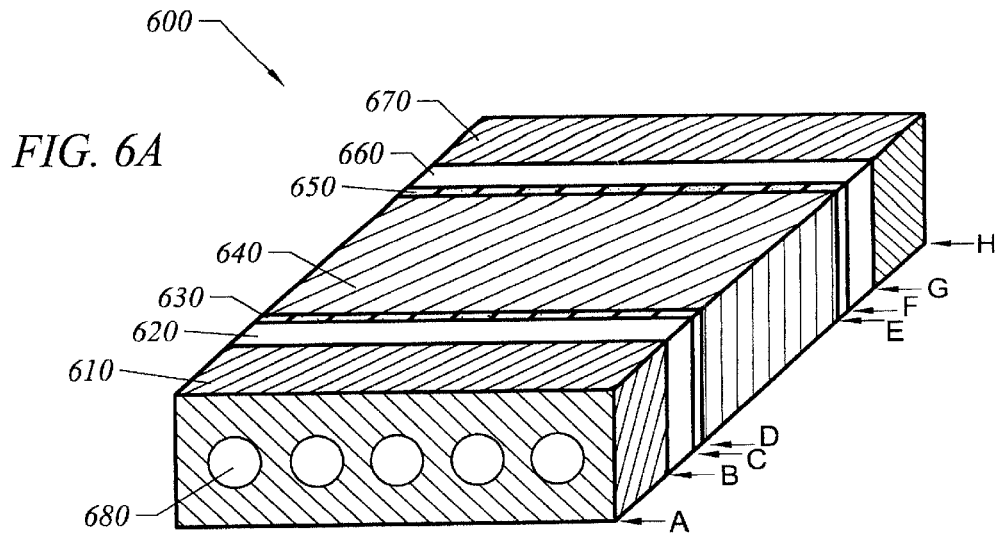
FIGS. 6A–6C illustrate by way of an isometric view, a top view, and a polarization state diagram, respectively, the structure and operation of another multiple-port circulator device according to an embodiment of the present invention.
Figure 6B:
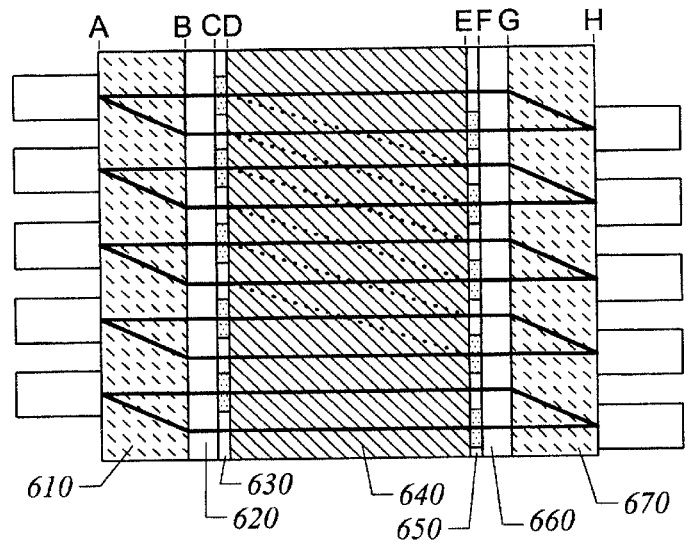
Figure 6C:
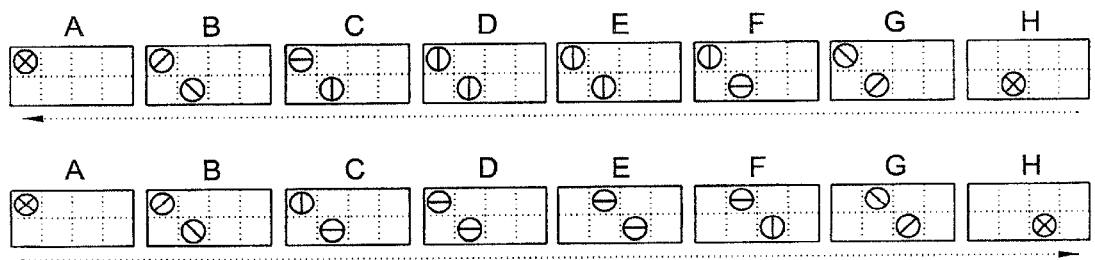

FIGS. 6A–6C show the elements and operation of another multiple-port circulator device 600 according to an embodiment of the present invention. The circulator device 600 includes PBS elements 610 and 670, Faraday rotator elements 620 and 660, half-wave plates 630 and 650, and SWP 640. The PBS element 610 is arranged such that its optic axis points in the direction of $\theta=45°$ relative to the z-axis and $\phi=135°$ relative to the y-axis, and the PBS element 670 is arranged such that its optic axis points in the direction of $\theta=45°0$ relative to the z-axis and $\phi=45°$ relative to the y-axis. The SWP 640 is arranged such that its principal plane lies parallel to the x-z plane (plane of the drawing with reference to FIG. 6B). The Faraday rotator elements 620 and 660 each have a uniform profile (i.e., uniform poling), whereas the half-wave plates 630 and 650 are each periodically etched as shown in FIG. 6B. That is, portions of each of the half-wave plates 630 and 650 have been removed, while the optic axis of each of the remaining portions is arranged so as to cause a 90° rotation. In this embodiment, each Faraday rotator element rotates the component beams in the same direction. The beam component interacting with the unetched (shaded) portion of a half-wave plate undergoes a 90° rotation whereas the beam component interacting with the etched (unshaded) portion passes through with its state of polarization unchanged.

Figure 7A:
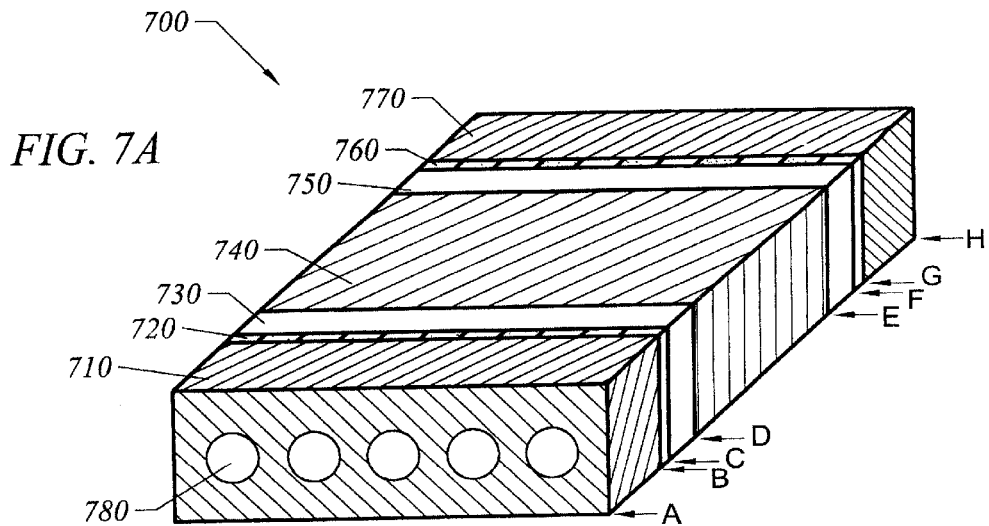
FIGS. 7A–7C illustrate by way of an isometric view, a top view, and a polarization state diagram, respectively, the structure and operation of another multiple-port circulator device according to an embodiment of the present invention.
Figure 7B:
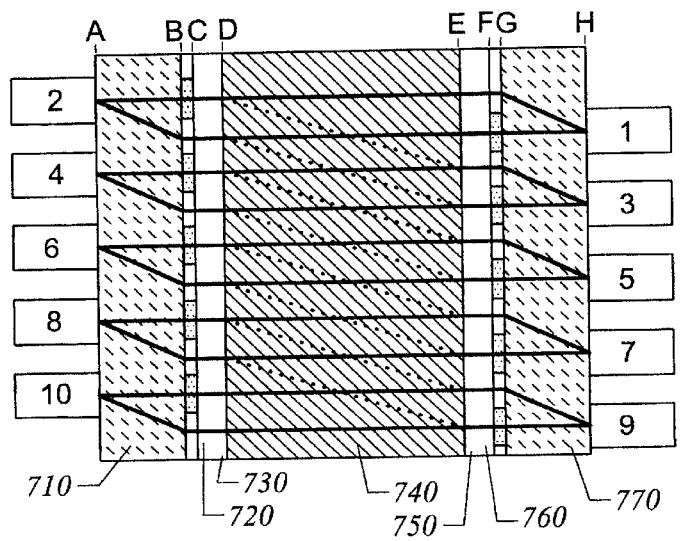
Figure 7C:
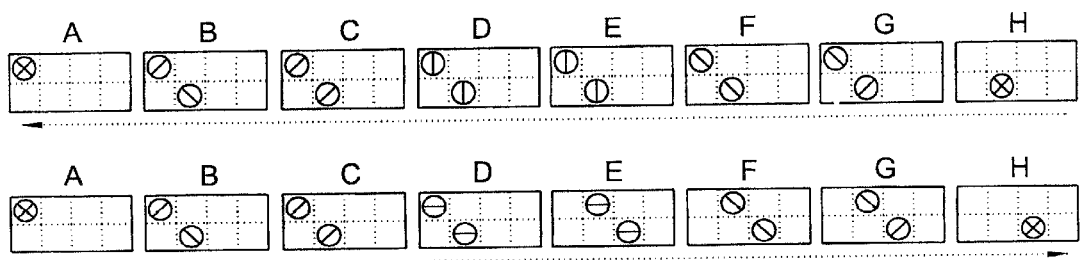

FIGS. 7A–7C show the elements and operation of another multiple-port circulator device 700 according to an embodiment of the present invention. The circulator device 700 includes PBS elements 710 and 770, Faraday rotator elements 720 and 760, half-wave plates 730 and 750, and a SWP 740. The structure and operation of the circulator device 700 is nearly identical to the circulator device 600. For example, the PBS element 710 is arranged such that its optic axis points in the direction of $\theta=45°$ relative to the z-axis and $\phi=135°$ relative to the y-axis; the PBS element 770 is arranged such that its optic axis points in the direction of $\theta=45°$ relative to the z-axis and $\phi=45°$ relative to the y-axis; and the SWP 740 is arranged such that its principal plane lies parallel to the x-z plane (plane of the drawing with reference to FIG. 7B). Additionally, the Faraday rotator elements 720 and 760 each have a uniform profile (i.e., uniform poling), and the half-wave plates 730 and 750 are each periodically etched as shown in FIG. 7B. One difference, however, is that the relative positions of the half-wave plates and Faraday rotator elements are reversed. That is, in the circulator device 700 a z-propagating beam's components first encounters a half-wave plate and then a Faraday rotator element. Such a reversal of position of the half-wave plates and Faraday rotator elements only affects the local polarization states of the component beams and does not change the general operation of the circulator device.

Figure 8A:
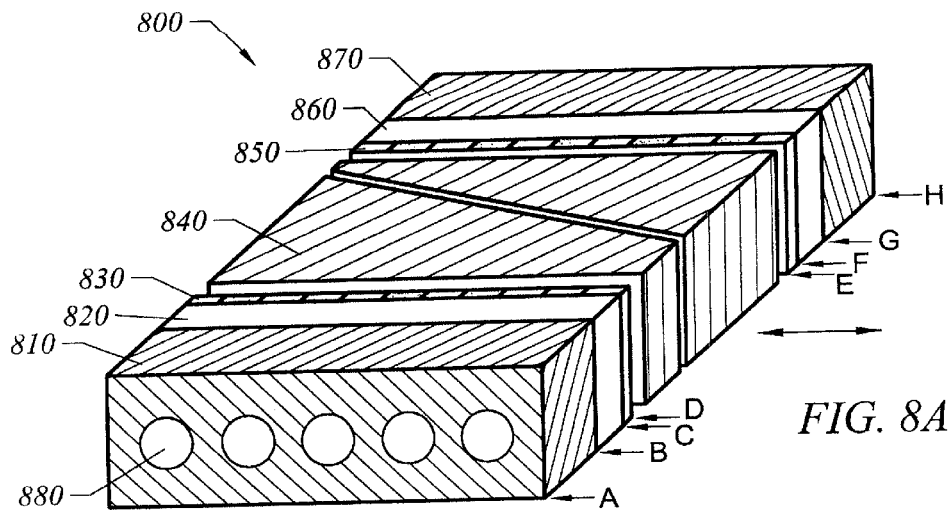
FIGS. 8A–8C illustrate by way of an isometric view, a top view, and a polarization state diagram, respectively, the structure and operation of another multiple-port circulator device having an adjustable SWP according to an embodiment of the present invention.
Figure 8B:
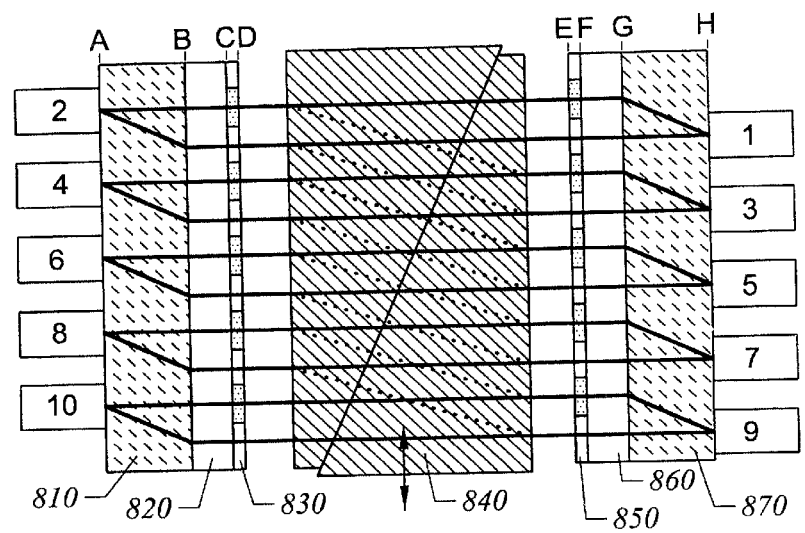
Figure 8C:
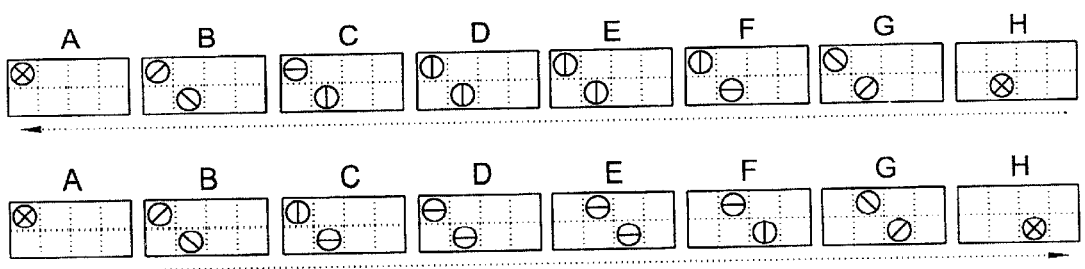

FIGS. 8A–8C show the elements and operation of another multiple-port circulator device 800 according to an embodiment of the present invention. The structure and operation of circulator device is nearly identical to the circulator device 600. A PBS element 810 is arranged such that the optic axis points in the direction of $\theta=45°$ relative to the z-axis and $\phi=135°$ relative to the y-axis; a PBS element 870 is arranged such that its optic axis points in the direction of $\theta=45°$ relative to the z-axis and $\phi=45°$ relative to the y-axis; and an SWP 840 is arranged such that the principal plane lies parallel to the x-z plane (plane of the drawing with reference to FIG. 8B). Additionally, Faraday rotator elements 820 and 860 each have a uniform profile (i.e., uniform poling), and half-wave plates 830 and 850 are each periodically etched as shown in FIG. 8B. Thus, the polarization state diagrams, FIGS. 6C and 8C, appear identical. According to the present embodiment, however, the thickness of the SWP 840 is adjustable. As shown in FIGS. 8A and 8B, a diagonal cut is made in the SWP 840 to allow for adjustment to the thickness by sliding one portion relative to the other in a vertical direction (relative to FIG. 8B). For example, if the right portion of the SWP 840 is moved upward (FIG. 8B), the thickness of the SWP 840 is increased, whereas if the right portion is moved downward, the thickness is decreased. As above, the SWP of the present embodiment is particularly useful when it is desired to change, or fine tune, the center-to-center spacing of optical port assemblies.

FIGS. 9A–9D show the elements and operation of another multiple-port circulator device 900 according to an embodiment of the present invention. The circulator device 900 includes PBS elements 910 and 970, Faraday rotator elements 920 and 960, half-wave plates 930 and 950, and a SWP 940. The PBS elements 910 and 970 are both arranged such that their principal planes are parallel to the y-z plane (plane of the drawing of FIG. 9C, which shows a cross-sectional side view of the circulator device 900). The SWP 940 is arranged such that its optic axis points in the direction of θ=45° relative to the z-axis and φ=45° relative to the y-axis. The Faraday rotator elements 920 and 960 each have a uniform profile (i.e., uniform poling), whereas the half-wave plates 930 and 950 are each partially etched as shown in the side view of FIG. 9C. That is, the bottom portion of each of the half-wave plates 930 and 950 have been removed, while the optic axis of the top (shaded) portions are each arranged so as to cause a 90° rotation. In this embodiment, each Faraday rotator element rotates the polarization of the component beams in the same direction. The beam component interacting with the unetched portion of a half-wave plate (upper component in FIG. 9C) undergoes a 90° rotation, whereas the beam component interacting with the etched portion (lower component in FIG. 9C) passes through with its state of polarization unchanged. As shown in the polarization state diagrams in FIG. 9D, the coupling port arrays are actually not in a horizontal plane. Rather the port arrays decline from the upper-left towards the lower right (as viewed in the +z direction). This is also true for the two-row coupling arrays of the circulator device 1000 described immediately below.

FIGS. 10A–10C show the elements and operation of another multiple-port circulator device 1000 according to an embodiment of the present invention. As shown, the circulator device 1000 has two rows, each with five input port coupling regions 1080. It should be appreciated, however, that the techniques of the present invention are equally applicable to producing and implementing a multiple-port circulator device having an N×M array of port coupling regions on one end face and a corresponding N×M array of port coupling regions on the opposite end face, where both N and M are on the order of 10, 100 or even more. In the present embodiment, an N=2 and M=5 example is used for simplicity.

The circulator device 1000 includes PBS elements 1010, Faraday rotator elements 1020 and 1060, half-wave plate elements 1030 and 1050 and a SWP 1040. The PBS elements 1010 and 1070 are each arranged such that their principal planes are parallel to the y-z plane (plane of the drawing of FIG. 10C, which shows a cross-sectional side view of circulator device 1000). The SWP 1040 is arranged such that its optic axis points in the direction of θ=45° relative to the z-axis and φ=45° relative to the y-axis. The Faraday rotator elements 1020 and 1060 each have a uniform profile (i.e., uniform poling), whereas the half-wave plates 1030 and 1050 are each partially etched, as shown in the side view of FIG. 10C. That is, the middle portion of each of the half-wave plates 1030 and 1050 have been removed, while the optic axis of each of the top and bottom shaded portions is arranged so as to cause a 90° rotation. Additionally, the etched, middle portion of each half-wave plate is preferably of sufficient dimension to allow for sharing by beam components from both the upper and lower port arrays (e.g., as shown in FIG. 10C). In this embodiment, each Faraday rotator element rotates the component beams in the same direction. The beam components interacting with the unetched portion of a half-wave plate (in FIG. 10C, the upper beam component in the upper array and the lower beam component in the lower array) undergo a 90° rotation, whereas the beam components interacting with the etched portion (in FIG. 10C, the lower beam component in the upper array and the upper beam component in the lower array) pass through with their states of polarization unchanged. In general, the thickness of the PBS elements 1010 and 1070 determine the minimum center-to-center spacing between the upper and lower port arrays on each end face of the circulator device 1000.

As arranged, the routing direction proceeds through consecutive ports in the upper array; light from port 1 passes to port 2, light from port 2 passes to port 3 and so on. In the lower array, the routing direction is reversed; light from port 10' passes to port 9', light from port 9' passes to port 8', and so on. A full circulation may be achieved by connecting the last port in the upper array (port 10) with the last port of the lower array (port 10'). Additionally, it should be appreciated that the routing direction of the lower array can follow that of the upper array by etching the half-wave plates such that each half-wave plate 1030 and 1050 includes two pairs of etched-unetched regions rather than the three regions shown in FIG. 10C. That is, the lower beam component of each array would interact with an unetched portion and would have its state of polarization rotated, and the upper beam component of each array would pass through with no change in the state of polarization.

Figure 11A:
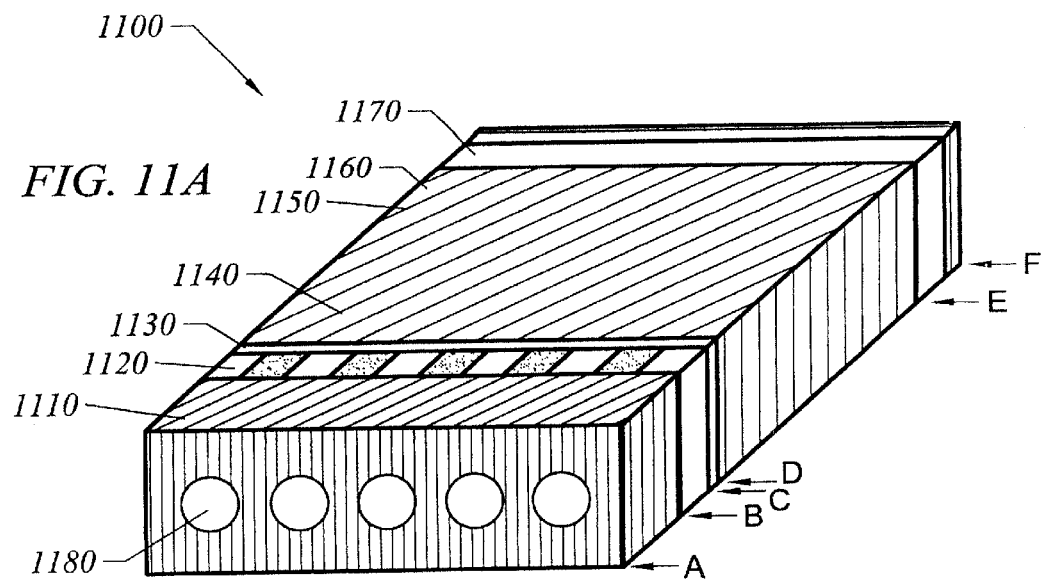
FIGS. 11A–11C illustrate by way of an isometric view, a top view, and a polarization state diagram, respectively, the structure and operation of a reflective-type multiple-port circulator device according to an embodiment of the present invention.
Figure 11B:
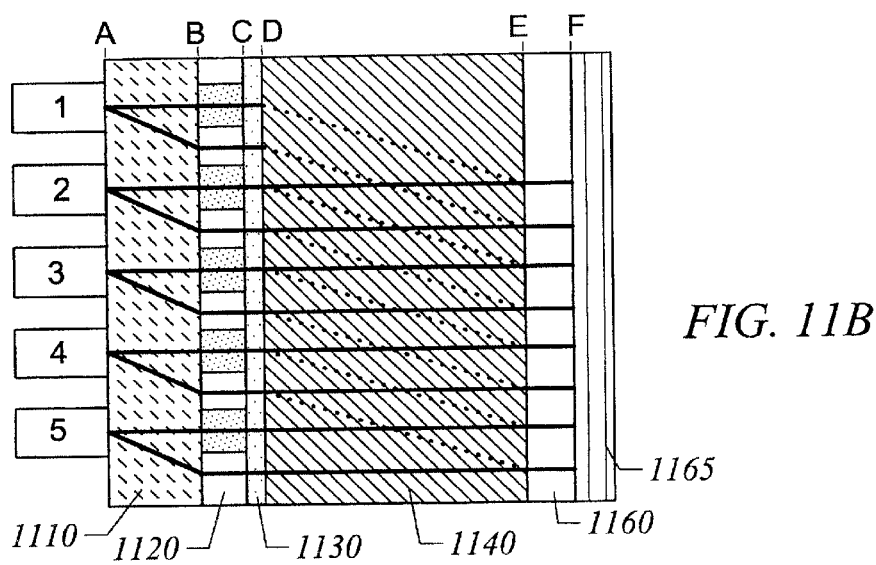
Figure 11C:
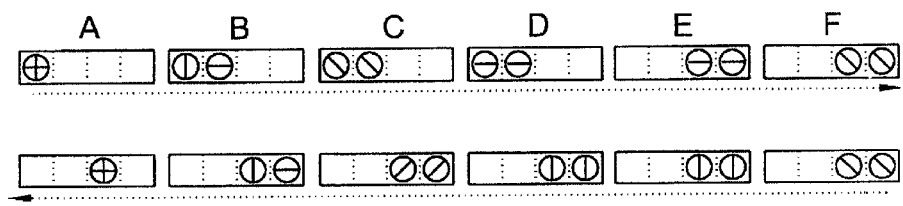

FIGS. 11A–11C illustrate the structure and operation of a reflective-type multiple-port circulator device 1100 according to an embodiment of the present invention. The circulator device 1100 includes PBS element 1110, Faraday rotator element 1120, half-wave plate 1130, SWP 1140, a Faraday rotator element 1160 and a reflection element 1165. The PBS element 1110 and SWP 1140 are both arranged with their principal planes parallel to the x-z plane (plane of the drawing of FIG. 11B). The Faraday rotator element 1120 is periodically poled as shown, whereas the Faraday rotator element 1160 is uniformly poled. Both Faraday rotator elements 1120 and 1160 are dimensioned so as to effect a 45° rotation. Thus, the Faraday rotator element 1120 rotates the polarization of the divided beam components 45° in opposite directions, and the Faraday rotator element 1160 rotates the divided beam components 45° in the same direction. The reflection element 1165 operates to reflect incident light beams with little to no loss, and with no change in the state of polarization.

According to the present invention, each reflection element, including the reflection element 1165, preferably includes a dielectric multilayer having a high reflectivity at the desired wavelength(s). Each reflection element may, however, include a reflective metallic film, such as a silver or gold film, a Noble metal film, or some other reflective metallic film. It is also noted that all port connection regions 1180 of the circulator device 1100 are located on the same end face due to the reflective operation of the device.

The general operation of the reflective-type circulator 1100 of FIGS. 11A–11B is therefore as follows. A (collimated) light signal received from an optical port, say, optical port 1, is split into two linearly polarized beams by the PBS element 1110, with the e-beam (x-polarized) being refracted (downwards in FIG. 11B) and the o-beam (y-polarized) maintaining its propagation direction. The beams reach oppositely poled regions of the Faraday rotator element 1120 and are rotated by 45° in opposite directions so that the beams are linearly polarized parallel to each other. Each of the beams is then rotated another 45° in the same direction (counterclockwise in FIG. 11C) by the half-wave plate 1130 so that each beam is polarized parallel to the principal plane of the SWP 1140 (i.e., x-polarized). Thus, both beams are refracted by the SWP 1140 (downwards in FIG. 11B). The two parallel beams, polarized parallel to each other, reach the Faraday rotator element 1160 and are rotated 45° in the same direction (clockwise in FIG. 11C).

The two parallel beams, polarized parallel to each other, interact with the reflection element 1165 and are reflected back through the Faraday rotator element 1160, which rotates both beams 45° in the same direction (clockwise in FIG. 11C) such that each beam is polarized perpendicular to the principal plane of the SWP 1140 (i.e., y-polarized). Thus, both beams pass through unrefracted by the SWP 1140. The two parallel beams, polarized parallel to each other, reach the half-wave plate 1130, which rotates both beams 45° in the same direction (clockwise in FIG. 11C). The beams, still linearly polarized parallel to each other, reach oppositely poled regions of the Faraday rotator element 1120 and are rotated 45° in opposite directions so that the beams are linearly polarized perpendicular to each other. The beams then enter the PBS element 1110 and are combined back into one beam of light; the original e-beam is still an e-beam to the PBS element 1110 and is refracted (upwards in FIG. 11B) and the original o-beam is still an o-beam and maintains its propagation direction. The combined beam enters optical port 2 and is focused and/or collimated into a fiber, e.g., using multisection fiber collimator assembly as discussed above, and ultimately passed to a coupled fiber. In this manner a light signal from any port (e.g., port 1) passes to the next consecutive port (e.g., port 2). The end port, e.g., port 5 in FIGS. 11A and 11B, is unable to pass light signals and acts much like an isolator. That is, incoming light signals received at port 5 is walked off by the SWP 1140 and therefore dispersed and/or absorbed.

It should be appreciated that PMD is insubstantial in the reflective-type circulator devices of the present invention. For example, the only element which might introduce PMD in the present embodiment is the PBS element 1110; the optical paths of the divided beam components is the same in the other elements. However, considering that the e-beam (tilted) experiences a smaller index of refraction, and therefore travels faster, the overall optical paths of the o-beam and e-beam are substantially the same.

Figure 12A:
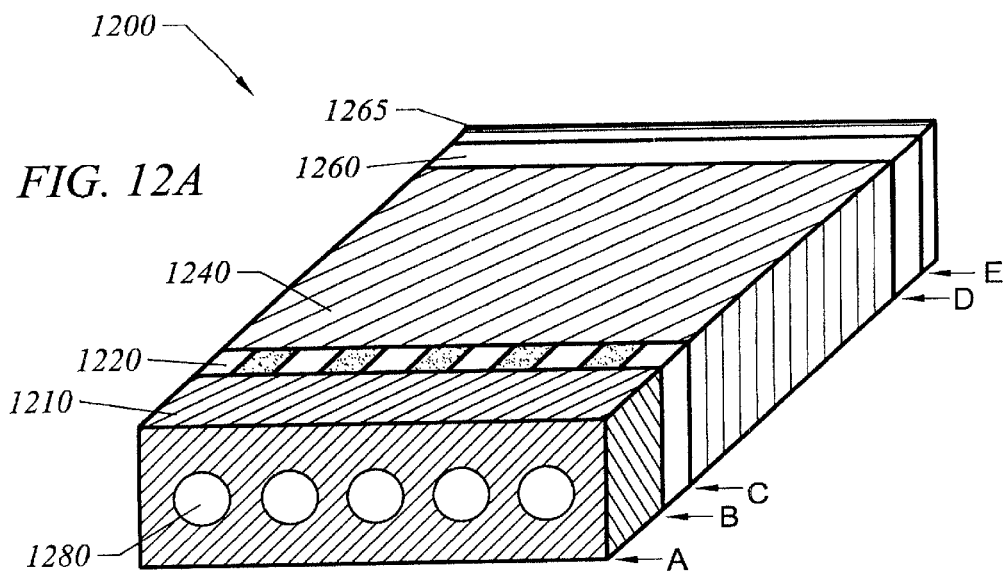
FIGS. 12A–12C illustrate by way of an isometric view, a top view, and a polarization state diagram, respectively, the structure and operation of another reflective-type multiple-port circulator device according to an embodiment of the present invention.
Figure 12B:
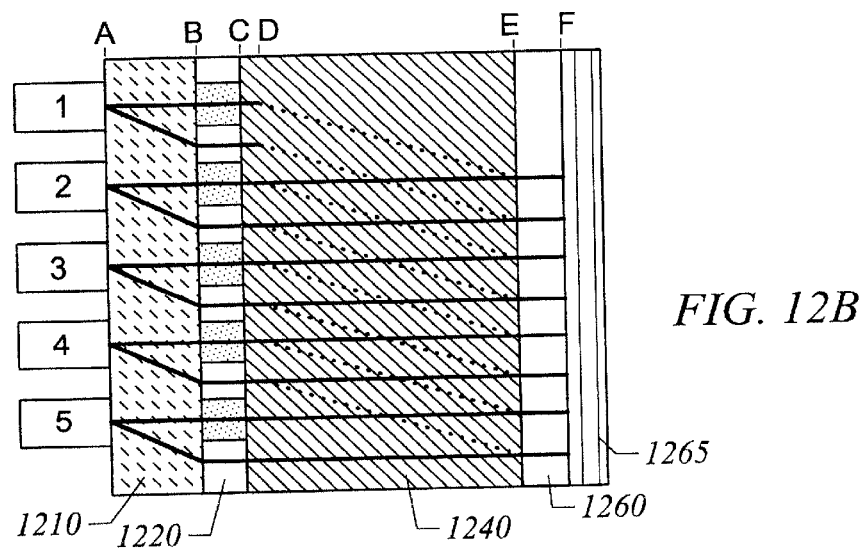
Figure 12C:
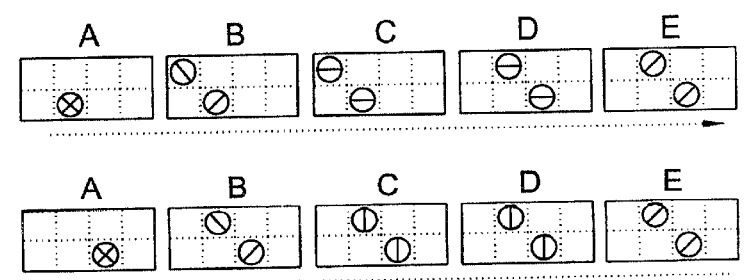

FIGS. 12A–12C illustrate the structure and operation of another reflective-type multiple-port circulator device 1200 according to an embodiment of the present invention. The circulator device 1200 includes a PBS element 1210, a periodically poled Faraday rotator element 1220, a SWP 1240, a uniformly poled Faraday rotator element 1260 and a reflection element 1265. The operation of the circulator device 1200 is similar to the circulator device 1100. However, in this embodiment, no half-wave plate is included. Rather, the PBS element 1210 is arranged such that its optic axis points in the direction of θ=45° relative to the z-axis and φ=45° relative to the y-axis, and the SWP 1240 is arranged such that its principal plane lies parallel to the x-z plane. When the mutually perpendicular e- and o-beam components of a forward propagating light signal (in the +z direction) encounter the Faraday rotator element 1220, the polarization of each is oriented at a 45° angle with respect to the principal plane of the SWP 1240. Therefore, rotation by the Faraday rotator element 1220 in opposite directions by 45° is sufficient to orient the polarization of the divided beams such that they are both parallel to the principal plane of the SWP 1240. Similarly, when the parallel polarized beam components emerge from the SWP 1240 (i.e., in the -z direction), rotation by the Faraday rotator element 1220 in opposite directions by 45° is sufficient to orient the beams so that they are mutually perpendicular with one component parallel to the principal plane of the PBS element 1210.

Figure 13A:
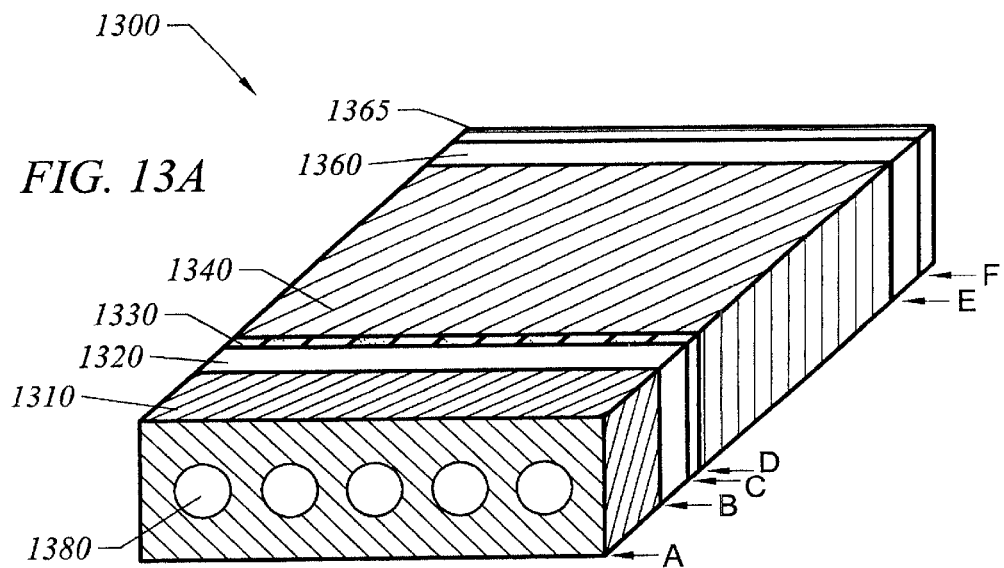
FIGS. 13A–13C illustrate by way of an isometric view, a top view, and a polarization state diagram, respectively, the structure and operation of another reflective-type multiple-port circulator device according to an embodiment of the present invention.
Figure 13B:
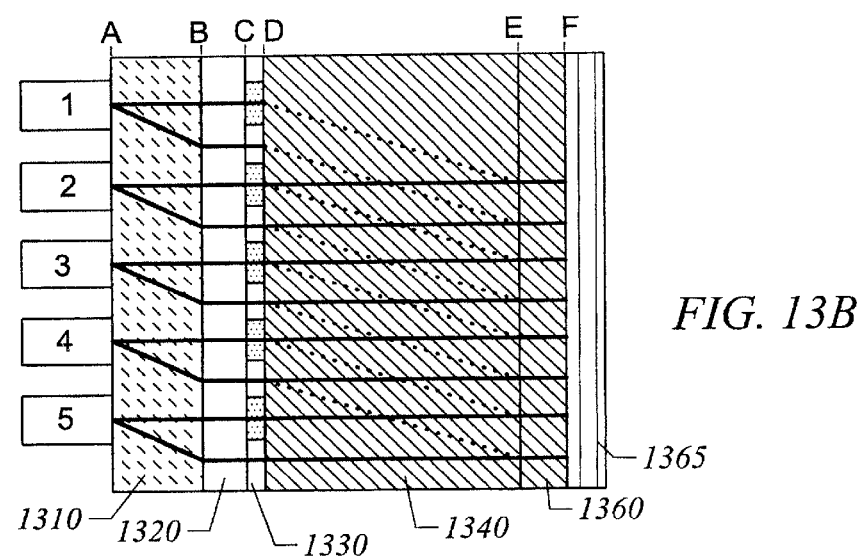
Figure 13C:
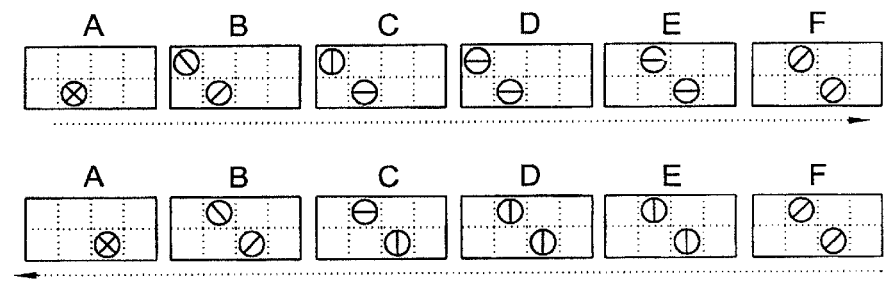

FIGS. 13A–13C illustrate the structure and operation of another reflective-type multiple-port circulator device 1300 according to an embodiment of the present invention. The circulator device 1300 includes a PBS element 1310, a uniformly poled Faraday rotator element 1320, a half-wave-plate 1330, a SWP 1340, a uniformly poled Faraday rotator element 1360 and a reflection element 1365. The operation of the circulator device 1300 is similar to the circulator device 1100. However, in this embodiment, the Faraday rotator elements 1320 and 1360 each have a uniform profile (i.e., uniform poling), whereas the half-wave plate 1330 is periodically etched as shown in FIG. 13B. That is, portions of the half-wave plate 1330 have been removed, while the optic axis of each of the remaining portions is arranged so as to cause a 90° rotation. Additionally, the PBS element 1310 is arranged such that its optic axis points in the direction of θ=45° relative to the z-axis and φ=135° relative to the y-axis, and the SWP 1340 is arranged such that its principal plane lies parallel to the x-z plane. In this embodiment, each Faraday rotator element rotates the component beams in the same direction. The beam component interacting with the unetched (shaded) portion of a half-wave plate undergoes a 90° rotation whereas the beam component interacting with the etched/removed (unshaded) portion passes through with its state of polarization unchanged.

It should be appreciated that an adjustable SWP, similar to the adjustable SWPs of FIGS. 4 and 8, may be used in reflective-type circulator device embodiments to allow for fine tuning the center-to-center spacing of the optical port assemblies. It will also be appreciated that a reflective-type circulator device having an N×M array of port coupling regions similar to the device shown in FIG. 10 may also be fabricated and implemented using the techniques of the present invention.

Fabrication Steps

The fabrication process of the optical circulators is described with reference to FIGS. 14–20. In general, the major fabrication processes for a circulator device include: formation of the magnetic garnet, magnetization/poling of the magnetic garnet, formation of the half-wave plates, formation of the PBS elements, formation of the SWP, integration of the circulator device and integration of the circulator device with a fiber array.

Figure 14:
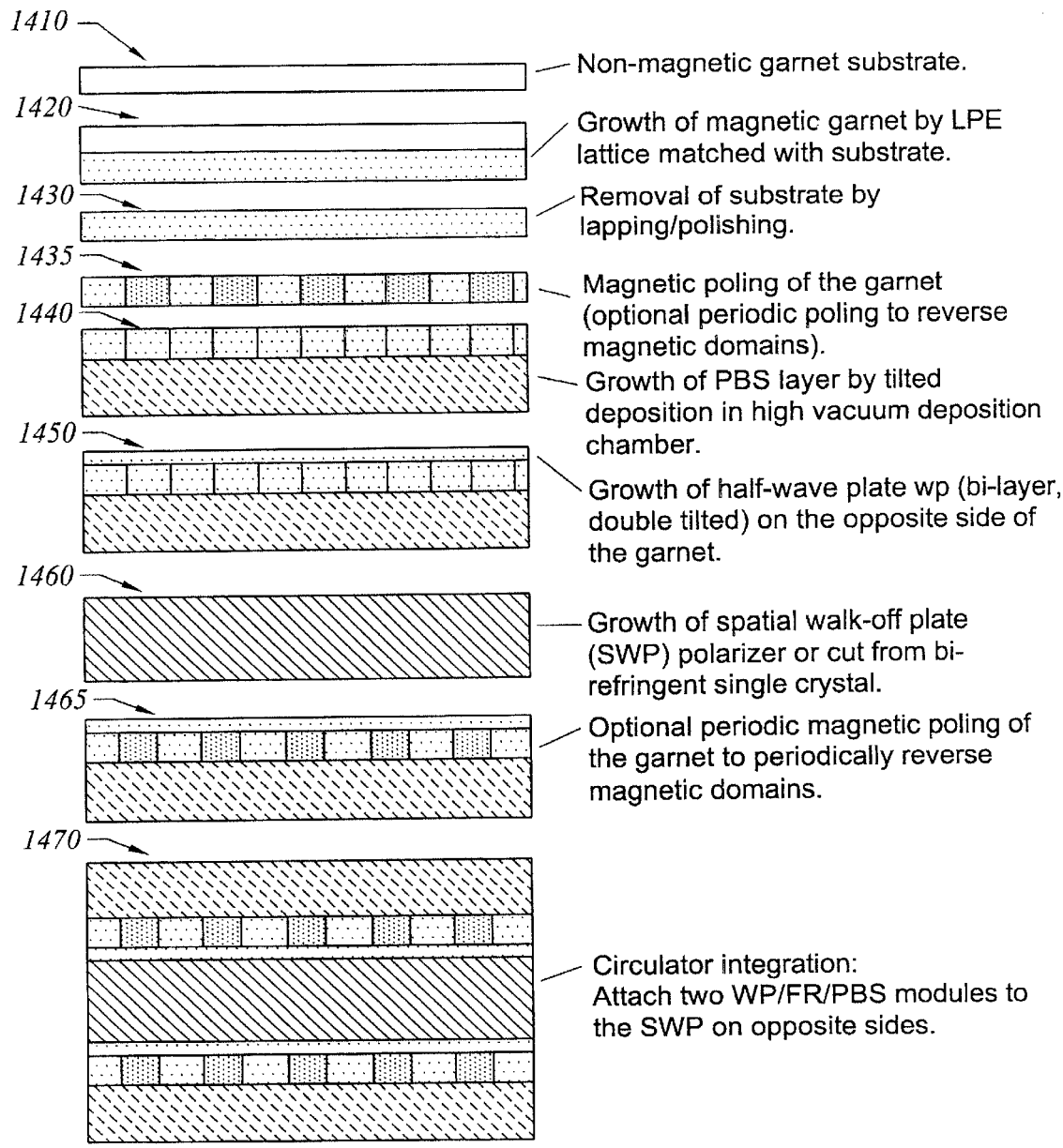
FIG. 14 illustrates a fabrication process of a core structure of a multiple port circulator device similar to the circulator device of FIG. 1 according to an embodiment of the present invention.

FIG. 14 illustrates a fabrication process of a core structure of a multiple port circulator device similar to the circulator device 100 of FIGS. 1A–1C according to an embodiment of the present invention. The process starts at step 1410 by positioning a non-magnetic garnet substrate (such as NGG, a=1.2509 nm; CMZ-GGG, a=1.2497 nm; YSGG, a=1.246 nm; or mixture of YSGG and GSGG, a=1.296 nm) on a substrate holder. At step 1420, a single crystalline magnetic garnet is grown on the substrate. The growth of single crystalline magnetic garnet is preferably accomplished by liquid phase epitaxy (LPE) at high temperature (~800–1000° C.). According to one embodiment, to obtain desired magneto-optic properties (e.g., high rotation power, low temperature/wavelength dependence), the garnet film is grown in a multi-component form, such as $RE1_aRE2_bBi_{3-a-b}Fe_{5-e-d}M1_cM2_dO_{12}$, where the elements RE1 and RE2 are added to substitute part of Bi, and are both selected from the lanthanide group, including for example: La, Pr, Nd, Sm, Eu, Gd, Tb, Dy, Ho, Yb, and Lu. M1, M2 are added to replace part of Fe, and are both selected from Ga, Al, and Sc. The values of a, b and c, d are adjusted to match the lattice constant between the growing film and substrate. During the growth process, the substrate holder is preferably constantly rotated (back and forth) to improve film uniformity. The growth zone is in an isothermal condition with a growth temperature slightly (10–20° C.) below the saturation temperature of the melt (which is a mixture of flux materials: PbO, $B_2O_3$ and growth materials: $Fe_2O_3$, $Bi_2O_3$, $RE1_2O_3$, $RE2_2O_3$, $M1_2O_3$ and $M2_2O_3$ with a pre-determined ratio).

U.S. Pat. Nos. 5,801,875 and 5,898,516 each disclose processes for forming magneto-optic materials, such as latched garnet materials, useful for forming Faraday rotator structures, and are each hereby incorporated in its entirety for all purposes.

After the growth of the magnetic garnet, the non-magnetic garnet substrate is removed by lapping/polishing at step 1430. Depending on the material used, the dimension along the z axis of a magnetic garnet is preferably in the range of between about 0.25 mm and about 1.0 mm, although garnets requiring a larger size may be used. At step 1435, the magnetic garnet is magnetically processed to obtain the desired magnetic poling profile. For example, in one embodiment, the magnetic garnet is uniformly poled. That is, the garnet is uniformly magnetized by an external field with a field strength, Br, larger than the coercivity of the garnet. In another embodiment, the magnetic garnet is thereafter periodically poled to obtain the desired periodically reversed magnetic domain structure. Additionally, the garnet is further polished to the correct thickness to provide a 45° rotation at a given wavelength. Alternatively, the garnet is first polished and then the appropriate magnetic fields are applied to the polished garnet.

FIGS. 15A–15F illustrate a magnetic processing methodology for obtaining the desired magnetic profile in the magnetic garnet according to an embodiment of the present invention. As shown in FIG. 15A at a step 1510, the as-grown magnetic garnet includes multiple domains. At step 1520 shown in FIG. 15B, the magnetic garnet is uniformly poled. According to one embodiment, a soft magnetic keeping layer is positioned proximate the magnetic garnet on one side and a permanent magnet having a magnetic field strength, Br, greater than the coercivity, Hcg, of the magnetic garnet is positioned on the opposite side. At step 1530, the keeping layer and magnet are removed as shown in FIG. 15C. At this point the magnetic garnet has a uniform magnetic profile, with all domains uniform and oriented in the same direction. For circulator device embodiments requiring a uniformly poled magnetic garnet, no further magnetic processing is required. For circulator device embodiments requiring a periodically poled magnetic garnet, a second poling process is performed. FIGS. 15D–15F further illustrate two different poling processes: cold poling and hot poling.

For the cold poling process shown in FIG. 15D, at step 1540, a soft magnetic keeping layer is positioned proximate the magnetic garnet on one side and a magnet having a magnetic field strength, Br, greater than the coercivity, Hcg, of the magnetic garnet is positioned on the opposite side. It should be appreciated that removing the keeping layer at step 1530 can be omitted when the cold poling process is used. As shown, the magnet includes a plurality of magnetic tips arranged and sized so as to create the desired poling pattern. The magnet and keeping layer are thereafter removed and the periodically poled garnet at step 1560 in FIG. 15E may be further processed by lapping/polishing as desired.

Figures 16A, 16B, 16C:
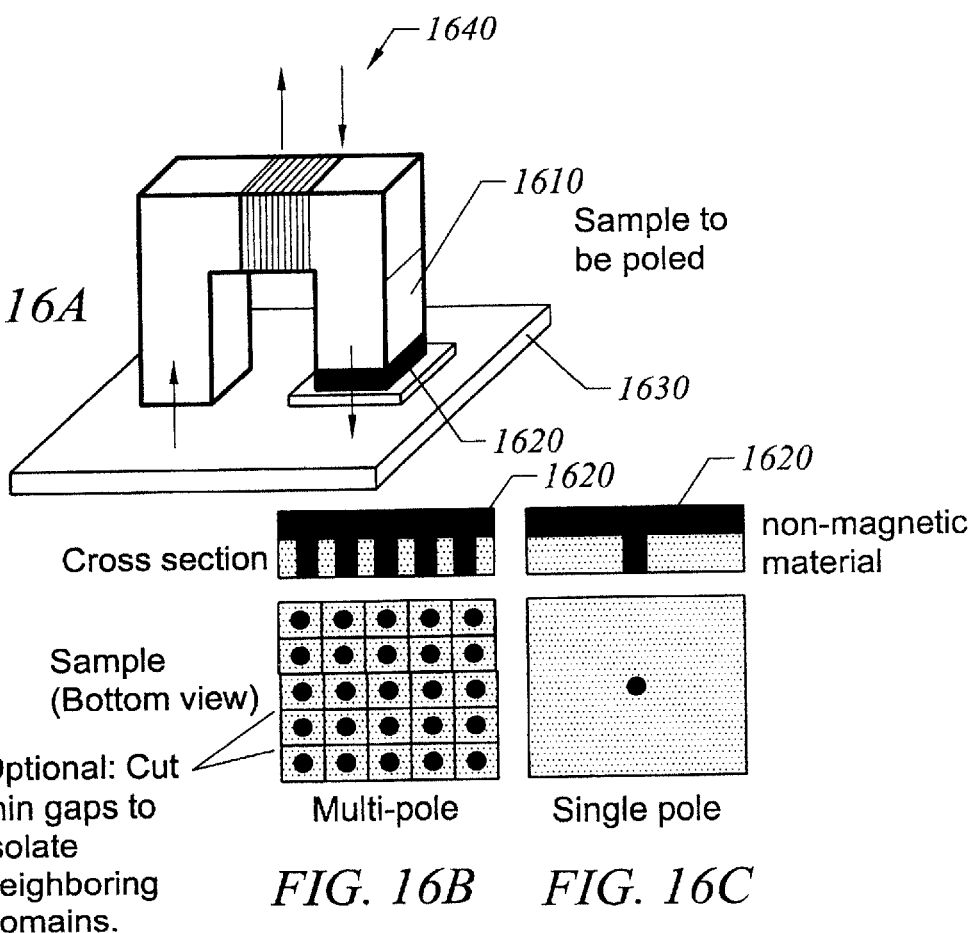
FIG. 16 illustrates a cold poling process arrangement according to an embodiment of the present invention.

FIGS. 16A–16C illustrates a cold poling process arrangement according to an embodiment of the present invention. As shown, a U-shaped magnetic core 1610 includes a magnetic poling mold 1620 at one end. The poling mold 1620 is a micro-lithographically defined mold having one (FIG. 16C) or more (FIG. 16B) magnetic micro-tips. In one embodiment, each micro-tip has a width of about 100 μm to about 250 μm. The garnet is positioned between the soft keeping layer 1630 and the magnetic poling mold 1630. An electric current sufficient to create the desired magnetic field strength within the magnetic core 1610 is applied through the electrical coil 1640. As shown in the cross sectional views of the magnetic poling mold 1620, one (FIG. 16C) or more (FIG. 16B) magnetic tips of magnetic material are interspersed within a non-magnetic material (shaded portions) such that only the magnetic domains coming into contact with the tips will have their fields reversed. Thus, with an appropriate arrangement and sizing of tips, the desired periodic poling pattern can be achieved. In one embodiment, as shown in the bottom view of the multi-pole layout of FIG. 16B, thin gaps are cut, or alternatively fused, in the magnetic garnet to delineate and isolate neighboring domains prior to the cold poling process.

For the hot poling process as shown in FIG. 15F, one or more heating beams are applied to the garnet with the appropriate pattern. That is, only those regions desired to be magnetically reversed are heated. In preferred aspects, the heating beams are collimated laser beams. Heating decreases the coercivity of the magnetic garnet so that a smaller magnetic field strength is needed to reverse the heated domains. Thus, a magnet having a field strength, Br, less than the normal (unheated) coercivity of the garnet, but great enough to reverse the heated domains, is positioned proximate the garnet. In this manner, the heated domains are reversed while the unheated domains are unaffected by the magnet. In one embodiment, the beams each have a diameter of about 250 μm. It should be appreciated that the garnet may be periodically poled using the hot poling process after the circulator device has been fabricated and integrated with a fiber array. In this case, heat beams can be introduced using the attached fiber array through the other elements of the circulator device, and a magnet can be positioned proximate the circulator device as appropriate.

Figure 18:
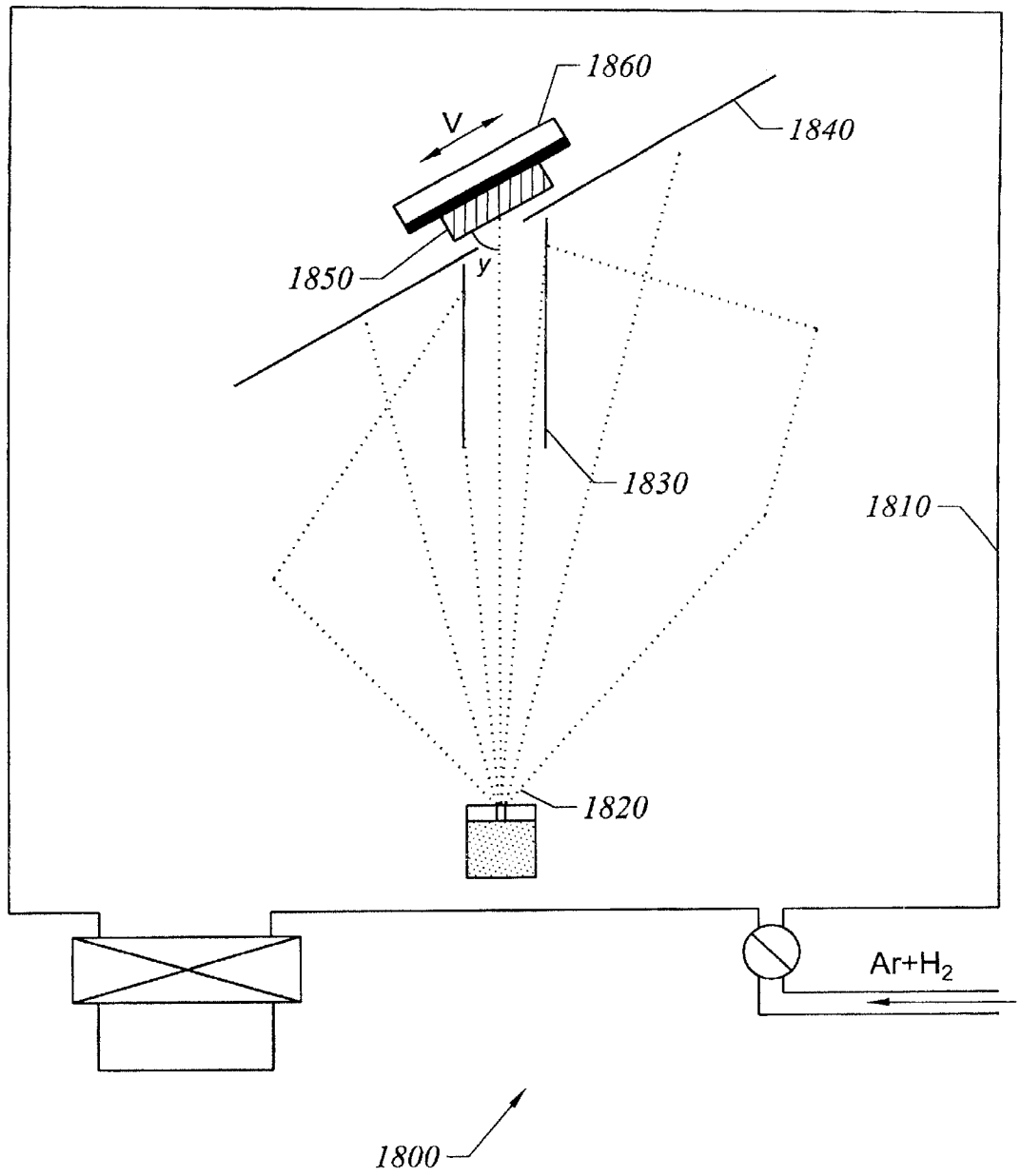
FIG. 18 illustrates a flux collimating and limiting arrangement for creating PBS and SWP layers by depositing thin films using either e-beam evaporation or ion-beams.

Returning to the fabrication process of FIG. 14, at step 1440, a PBS layer of desired thickness (e.g., between about 0.25 mm and about 1.0 mm in some embodiments) is grown on the magnetic garnet. In one embodiment, the PBS layer is deposited using e-beam evaporation, or an ion-beam, in a flux collimating and limiting arrangement 1800, as shown in FIG. 18. According to this embodiment, the magnetic garnet is mounted on a tilted substrate holder 1860 in a high vacuum deposition chamber 1810. Before the growth of the PBS layer, the garnet is preferably AR (anti-reflection) coated. To obtain a large birefringence, silicon (Si) is used as the source building material 1820 (rather than $SiO_2$) with some fine (<50 nm) voids in between. To saturate the dangling bond of the amorphous Si, small amount (5–10%) of $H_2$ gas is added to Argon gas and pumped into the chamber. The deposition pressure is critical for the fineness control of the Si columnar structure.

To obtain large birefringence, the tilting angle of the substrate (γ) is tuned. In one embodiment, for example, the tilting angle is set at between about 65° and about 70°, and preferably about 65°, to obtain the maximum birefringence. Due to the large tilting angle of the substrate, non-uniformity of the growing film between the lower and upper part of the substrate becomes a problem since for a point source, the flux density is inversely proportional to the squared distance ($R^2$) between the source and the substrate. To correct the problem, in one embodiment, substrate holder 1860 is designed to move parallel to the slot of plate 1840 with a varying speed, slower (longer time to collect material) at the upper part and faster (shorter time) at the lower part. After finishing the deposition of the PBS layer 1850, the surface is preferably AR (anti-reflection) coated to enhance optical transmission and to protect against moisture incorporation into the voids (fine air gaps) in the PBS layer.

Returning again to FIG. 14, at step 1450, for embodiments including a half-wave plate, a bi-layer, double tilted half-wave plate is grown on the side of the garnet opposite the PBS layer. FIG. 17 illustrates a half-wave plate created from bi-directionally obliquely deposited thin films according to an embodiment of the present invention. Growth of a half-wave plate is accomplished using the thin film deposition technique described above with reference to FIG. 18, using a metal oxide as the source material being deposited. For example, any number of metal oxides, such as $Ta_2O_5$ and $TiO_2$, can be used. For the second layer, the substrate is rotated 180° relative to the source. U.S. Pat. No. 4,874,664, which is hereby incorporated by reference in its entirety, discloses techniques using a crucible having inclined through-holes, for producing a bi-layer, double tilted half-wave plate and other similar structures. In general, the birefringence ($\Delta n$) is created by the tilted layer structure. The bi-directional deposition improves both film and view-angle uniformity. To produce a half-wave plate, the thickness, d, of the film should satisfy the following equation:

$$\Delta n * d = \lambda/2.$$

Such a half-wave plate rotates linearly polarized light by $2\theta$, where $\theta$ is the direction of linear polarization of the incident light with respect to the optical axis before entering the half-wave plate. Thus, for example, if the half-wave plate is arranged such that $\theta$ is 22.5°, the polarization is rotated 45°. Similarly, if the half-wave plate is arranged such that $\theta$ is 45°, the polarization is rotated 90°. Such techniques are advantageous as the resulting half-wave plate is very thin, e.g., on the order of 10 $\mu$m or less. Further, such a half-wave plate produces no beam separation and can be formed on any substrate by any of a variety of metal oxides and other materials. In general, half-wave plates formed using the bi-layer deposition techniques of the present invention have an advantageous thickness of between about 5 $\mu$m and about 20 $\mu$m.

Returning again to FIG. 14, at step 1460, a SWP is grown using the tilted deposition techniques as described above. Alternatively, the SWP is cut from a birefringent single crystal as is well known. At step 1465, the magnetic garnet is optionally poled to reverse the magnetic domains. It should be appreciated that periodic poling of the garnet can be performed at many stages during the fabrication process. For example, the garnet may be uniformly poled at step 1430 and then immediately thereafter periodically poled at step 1435, or it may be periodically poled at step 1465 after the growth of the PBS and/or half-wave plate elements. Alternatively, the garnet may be periodically poled after the circulator device has been fabricated and attached to a fiber array (e.g., using a hot poling process) as discussed above.

At step 1470, two PBS modules (each including the PBS, garnet and waveplate as shown) are attached to opposite sides of the SWP as shown to form the circulator array device. It should be appreciated that any of the elements of the circulator devices of the present invention may be AR coated as desired during the fabrication process.

Figure 19:
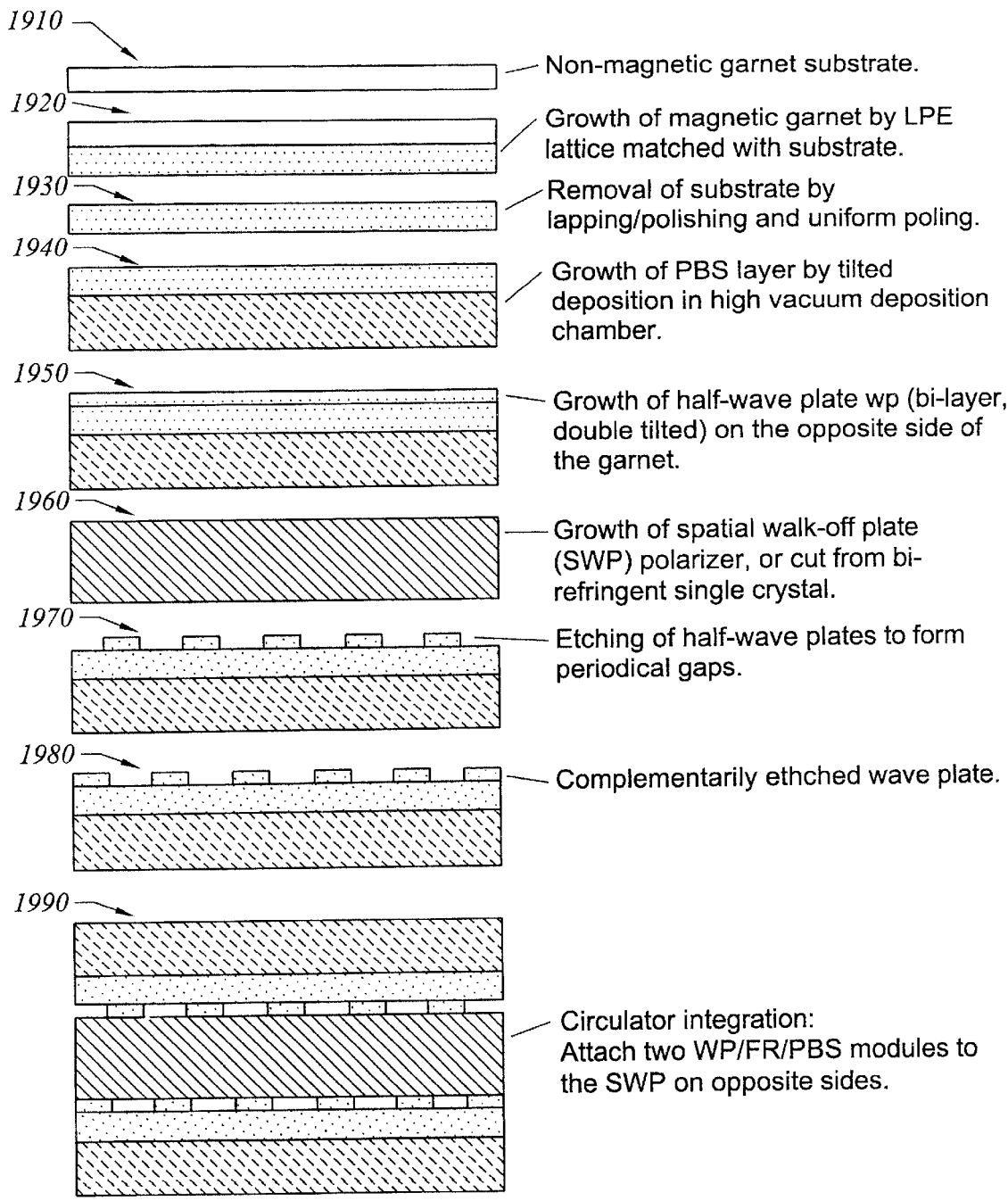
FIG. 19 illustrates another fabrication process of a core structure of a multiple port circulator device similar to the circulator device of FIG. 8 according to an embodiment of the present invention.

FIG. 19 illustrates another fabrication process, similar to the process of FIG. 14, including the formation of etched half-wave plates according to an embodiment of the present invention. One notable difference is that, at step 1970, the half-wave plates are periodically etched to produce periodic gaps of desired dimension. In this process, conventional masking and etching techniques are used to obtain the desired etch pattern. It should also be appreciated that, although not shown in FIG. 19, the magnetic garnet may be periodically poled as discussed above with reference to FIG. 14.

It should be appreciated that reflective-type circulator embodiments of the present invention are fabricated in a similar fashion as is shown, for example, in FIGS. 14 and 19. One notable difference, of course, is the formation of the reflective element. In preferred aspects the reflective element is formed by deposition of dielectric multi-layers, or a thin reflective metallic film, on the garnet comprising the adjacent Faraday rotator element (e.g., the Faraday rotator element 1160 in FIG. 11). Alternatively, a pre-formed dielectric multi-layer or mirror element may be attached as is well known. Another difference is that one of the two PBS modules, e.g. as shown at step 1470 in FIG. 14, is replaced with a reflector module including the reflection element and the adjacent Faraday rotator element.

Figure 20:
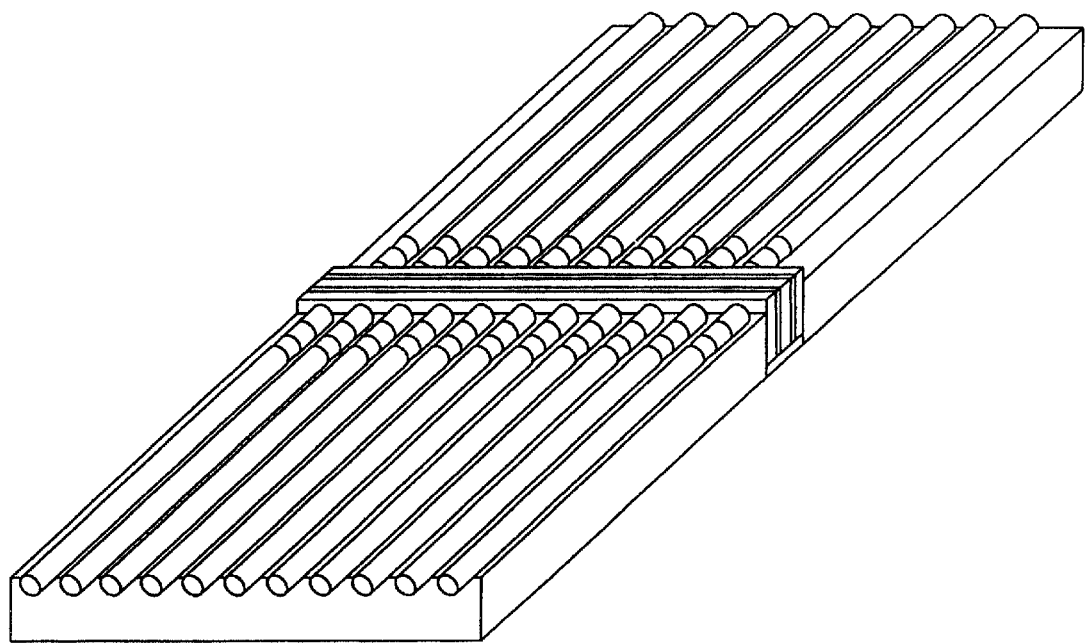
FIG. 20 illustrates a circulator device attached to a fiber array according to an embodiment of the present invention.

FIG. 20 illustrates a circulator device attached to a fiber array, according to an embodiment of the present invention. As shown, the circulator device is mounted with a fiber array on a v-groove substrate. In one embodiment, an end of each optical fiber is coupled to a multisection fiber collimator assembly. One such assembly is disclosed in U.S. Pat. No. 6,014,483, which was previously incorporated by reference. In one embodiment, as an example, with the step-index (e.g., silica) section of such an assembly being about 135 $\mu$m and the graded-index section being about 610 $\mu$m, a divergence angle of less than 1° is advantageously produced. The end of each multisection fiber collimator is attached to a corresponding port coupling region on the end faces of the PBS elements. For a reflective circulator device, for example, the embodiments disclosed with reference to FIGS. 11–13, a fiber array need only be coupled to the PBS element opposite the reflective element.

It should be appreciated that other fiber collimators may be used for coupling ends of fibers to port coupling regions defined by the PBS elements of the various circulator device embodiments. For example, arrays of miniature GRIN lenses, e.g., each with a diameter on the order of 1 mm or smaller, may be used, or thermal expanded core (TEC) fiber collimators may be used. Reference is made to U.S. Pat. No. 5,594,825 and an article by K. Shiraishi, Y. Aizawa and S. Kawakami, "Beam expanding fiber using thermal diffusion of the dopant," *Journal of Lightwave Technology*, Vol. 18, No. 8, August 1990, pp. 1151–1161, which is each hereby incorporated in its entirety for all purposes.

Figure 21A:
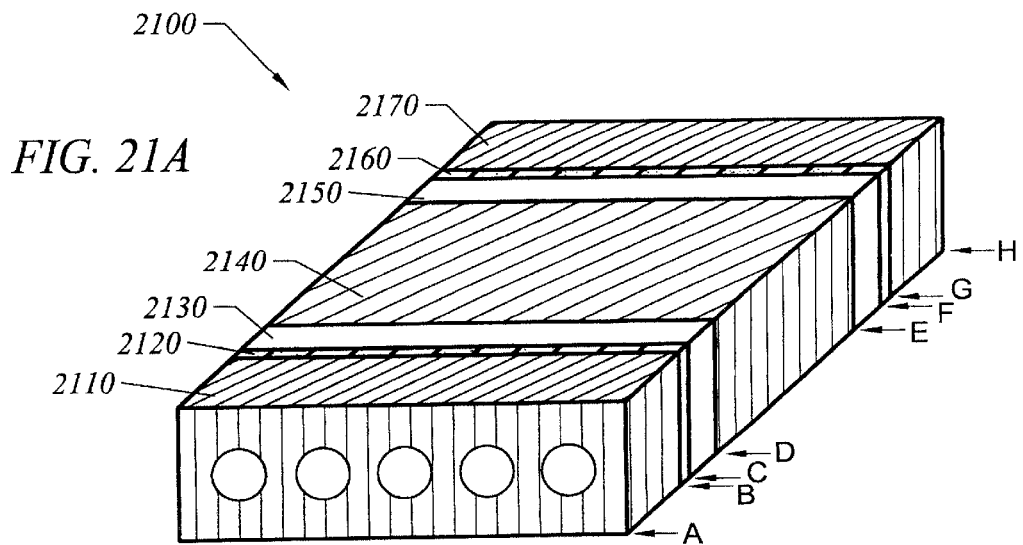
FIGS. 21A–21C illustrate by way of an isometric view, a top view, and a polarization state diagram, respectively, the structure and operation of a multiple-port circulator device including half-wave plates having oppositely oriented regions according to an embodiment of the present invention.
Figure 21B:
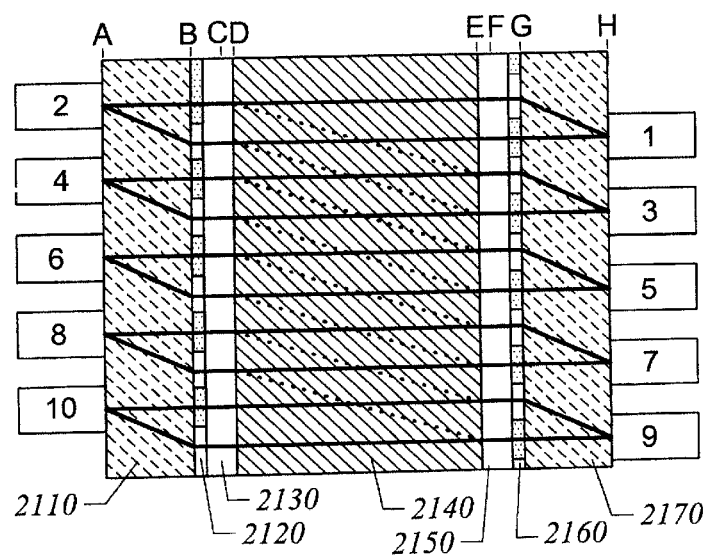
Figure 21C:
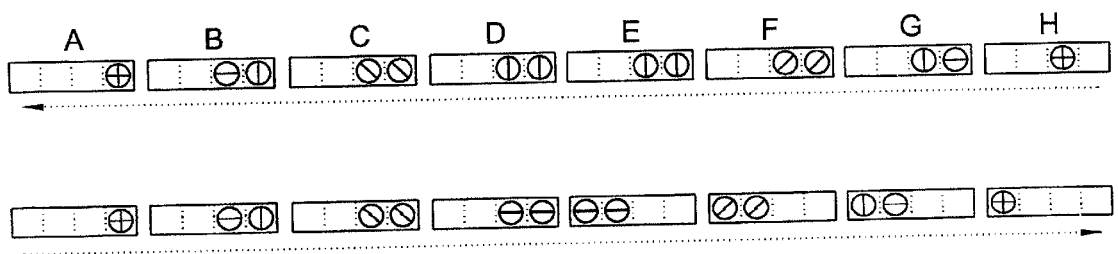

FIGS. 21A–21C show the elements and operation of another multiple-port circulator device 2100, according to an embodiment of the present invention. The circulator device 2100 includes PBS elements 2110 and 2170, Faraday rotator elements 2120 and 2160, half-wave plates 2130 and 2150, and a SWP 2140. In this embodiment, the Faraday rotator elements 2120 and 2160 are uniformly poled, and the half-wave plates 2130 and 2170 each have oppositely oriented half-wave plate regions arranged so as to rotate the component beams of an optical signal by 45° in opposite directions. That is, the optic axes of adjacent regions of each half-wave plate are arranged so as to rotate the corresponding beam components in opposite directions. The PBS elements 2110 and 2170 and the SWP 2140 are each arranged such that their principal planes are each parallel to the x-z plane (plane of the drawing of FIG. 21B). In the circulator device 2100, the relative positions of the half-wave plates and Faraday rotator elements are arranged such that a forward z-propagating beam's components first encounter a half-wave plate and then a Faraday rotator element. For example, as shown in FIG. 21C, the mutually perpendicular polarized components of an optical signal originating from an odd-numbered port first encounter oppositely oriented regions of the half-wave plate 2150, which rotates each beam component by 45° in the opposite direction so that they are polarized parallel to each other. The beam components then encounter the Faraday rotator element 2160, which rotates the components by 45° such that they are polarized perpendicular to the principal plane of the SWP 2140 (position E in top portion). Thus, as with the embodiment in FIG. 1, the combination of each adjacent pair of Faraday rotator and half-wave plate elements operates to convert mutually perpendicular polarization components into components having parallel states of polarization in a desired orientation. Similarly, each adjacent pair of Faraday rotator and half-wave plate elements convert components having parallel polarization states into mutually perpendicular polarization states.

It should be appreciated that the relative positions of the Faraday rotator elements 2120 and 2160 and the half-wave plate elements 2130 and 2170 may be reversed as it only affects the local polarization states. Additionally, additional embodiments, including reflective-type circulator device embodiments, may be implemented using half-wave plates having two or more oppositely oriented regions with the appropriate arrangement of PBS and SWP elements.

Figure 22:
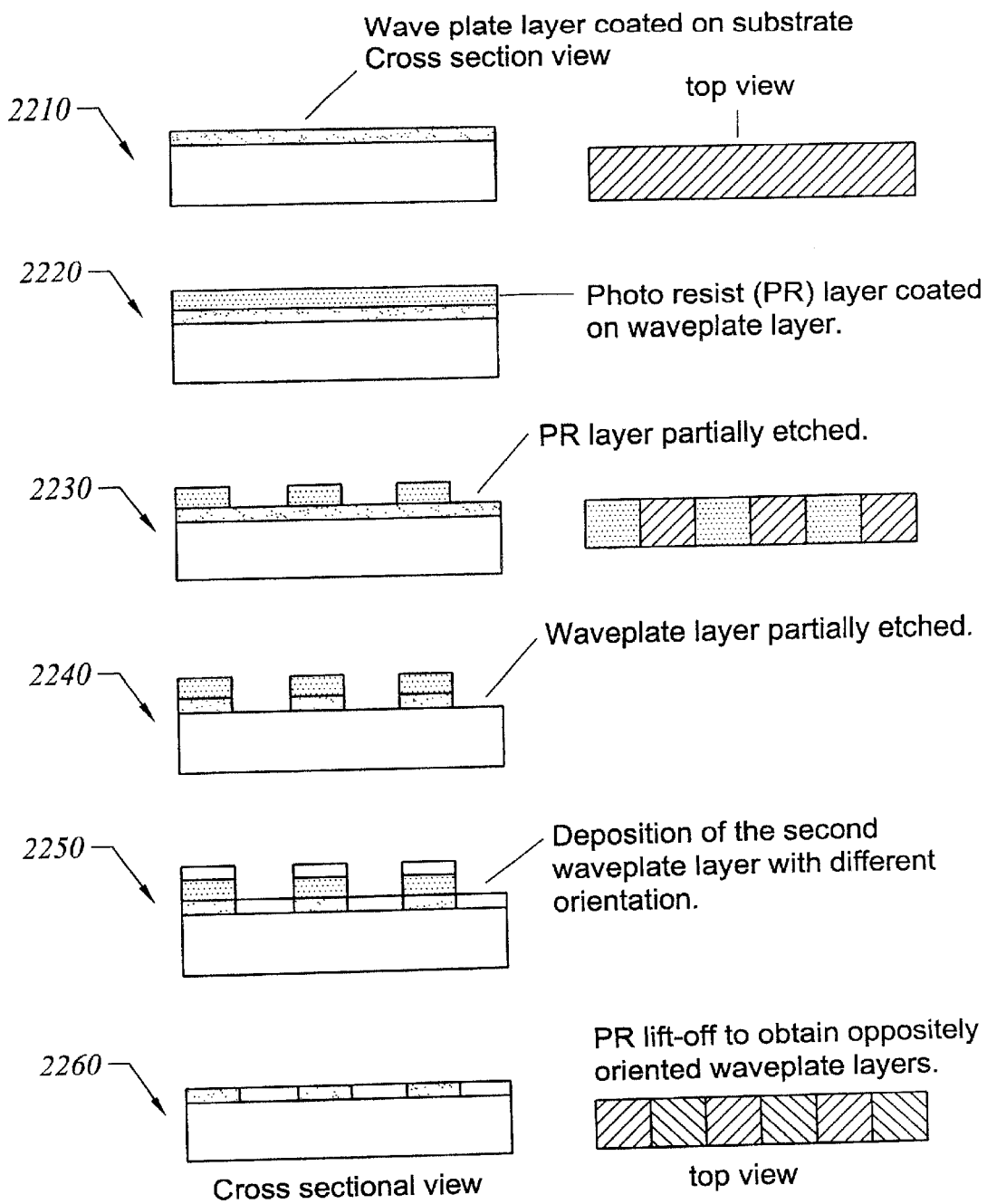
FIG. 22 illustrates a process of fabricating a half-wave plate having oppositely oriented regions according to an embodiment of the present invention.

FIG. 22 illustrates a process of fabricating a half-wave plate having oppositely oriented regions according to an embodiment of the present invention. At step 2210, a first half-wave plate layer having a desired orientation is deposited on a substrate, e.g., garnet as in step 1450 of FIG. 14. The first half-wave plate layer is preferably deposited using the techniques described above with reference to FIG. 17. At step 2220, a photo resist layer is formed on the half-wave plate layer, and at step 2230 the photo resist layer is masked with the desired pattern and etched using conventional masking and etching techniques as are well known. At step 2240, the exposed half-wave plate layer is etched. At step 2240, a second half-wave plate layer having a desired orientation different from the orientation of the first half-wave plate layer is deposited, preferably using the same techniques as used in step 2210. At step 2260, the photo resist layer (deposited in step 2220) is lifted off along with the second half-wave plate layer deposited thereon using conventional lift-off techniques so as to form a half-wave plate including oppositely oriented half-wave plate regions. It should be appreciated that "oppositely oriented" refers to different orientations of the optic axes of the first and second half-wave plate layers. In preferred aspects, the first and second half-wave plate layers are arranged with oppositely oriented regions such that the state of polarization of the beam components of a split optical signal are rotated in opposite directions, e.g., by 45°.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An optical device for coupling arrays of optical fiber ports, the device comprising:

a birefringent element arranged so that light traveling parallel to a propagation axis and having a first linear polarization orientation passes through parallel to the propagation axis and light traveling parallel to the propagation axis and having a second linear polarization orientation perpendicular to the first polarization orientation is deflected at an angle relative to the propagation axis;

first and second polarization orientation elements coupled to opposite ends of the birefringent element; and first and second polarization beam splitting (PBS) films deposited on said first and second polarization orientation elements, respectively, wherein the end face of each of the first and second PBS films opposite the polarization orientation elements defines an array of two or more port coupling regions for coupling light signals from an array of two or more optical fiber ports, with one PBS film defining even numbered ports and the other defining odd numbered ports, wherein the first and second PBS films are dimensioned and arranged so as to split a light signal in a forward direction into two parallel beams of light linearly polarized perpendicular to each other, and to combine parallel beams of light linearly polarized perpendicularly to each other in the reverse direction into a single beam of light;

wherein the first polarization orientation element is arranged with respect to the birefringent element and the first PBS film so as to orient the polarization of both of the parallel light beams of a first optical signal propagating along a forward direction from a first port coupling region on the first PBS film parallel to the first linear polarization orientation so that both beams simultaneously pass through the birefringent element parallel to the propagation axis, and to orient the polarization of two beams linearly polarized parallel to each other propagating in the reverse direction so that they are polarized perpendicular to each other, and wherein the first polarization orientation element refracts the light deflected by the birefringent element parallel to the propagation axis; and wherein the second polarization orientation element is arranged with respect to the birefringent element and the second PBS film so as to orient the polarization of both of the parallel light beams of a second optical signal propagating along a forward direction from a second port coupling region on the second PBS film parallel to the second linear polarization orientation so that both beams are simultaneously deflected in the birefringent element, and to orient the polarization of two beams linearly polarized parallel to each other propagating in the reverse direction so that they are mutually perpendicular;

whereby the first optical signal passes from the first port coupling region to the second port coupling region, and the second optical signal passes from the second port coupling region to a third port coupling region.

2. The device of claim 1, wherein the birefringent element is a spatial walk-off polarizer (SWP) cut from a birefringent crystal.

3. The device of claim 2, wherein the SWP crystal is selected from the group consisting of rutile, $YVO_4$, calcite, and $LiNbO_3$.

4. The device of claim 2, wherein the thickness of the SWP crystal along the propagation axis is between about 1.0 mm and about 3.0 mm.

5. The device of claim 1, wherein the birefringent element is a spatial walk-off polarizer (SWP) made by thin film deposition with a tilted substrate assembly.

6. The device of claim 5, wherein the thickness of the SWP film along the propagation axis is between about 0.5 mm and about 1.0 mm.

7. The device of claim 1, wherein the first and second polarization orientation elements each consists of a periodically poled Faraday rotator element having periodically reversed magnetic domains arranged such that the states of polarization of the two parallel light beams of an optical signal are rotated in opposite directions.

8. The device of claim 7, wherein the birefringent element is oriented so that deflected light having the second linear polarization orientation has a deflection component along a deflection axis perpendicular to the propagation axis, and wherein the first and second PBS films are arranged such that the optic axis of each points in a direction that is approximately 45° relative to the propagation axis and approximately 45° relative to a third axis that is perpendicular to both the propagation and deflection axes.

9. The device of claim 1, wherein the first and second polarization orientation elements each includes a Faraday rotator element and a bi-layer waveplate film deposited thereon.

10. The device of claim 9, wherein the first and second PBS films are deposited on the first and second Faraday rotator elements, respectively, such that the first and second waveplate films are coupled to the birefringent element.

11. The device of claim 9, wherein the first and second PBS films are deposited on the first and second waveplate films, respectively, such that the first and second Faraday rotators are coupled to the birefringent element.

12. The device of claim 9, wherein each of the first and second Faraday rotator elements has periodically reversed magnetic domains and is arranged such that the states of polarization of the two parallel light beams of an optical signal are rotated in opposite directions.

13. The device of claim 9, wherein each of the first and second Faraday rotator elements is uniformly poled such that the states of polarization of the two parallel light beams of an optical signal are rotated in the same direction, wherein one or more portions of each of the first and second waveplate films has been removed, and wherein each waveplate film is arranged and dimensioned such that the state of polarization of only one of the two parallel light beams of an optical signal is rotated.

14. The device of claim 9, wherein the birefringent element is a spatial walk-off polarizer (SWP) cut from a birefringent crystal, and wherein the SWP includes a diagonal cut, such that movement of the two pieces along the diagonal cut alters the dimension of the SWP along the propagation axis.

15. The device of claim 12 or 14, wherein the birefringent element is oriented so that deflected light having the second linear polarization orientation has a deflection component along a deflection axis perpendicular to the propagation axis, and wherein the first and second PBS films are arranged such that the optic axis of each points in a direction that is approximately 45° relative to the propagation axis and parallel to the plane defined by both the propagation and deflection axes.

16. The device of claim 12 or 13, wherein the birefringent element is oriented so that deflected light having the second linear polarization orientation has a deflection component along a deflection axis perpendicular to the propagation axis, and wherein the first and second PBS films are arranged such that the optic axis of each points in a direction that is approximately 45° relative to the propagation axis and in the plane defined by the propagation axis and a third axis perpendicular to both the propagation and deflection axes.

17. The device of claim 13 or 14, wherein the birefringent element is oriented so that deflected light having the second linear polarization orientation has a deflection component along a deflection axis perpendicular to the propagation axis, wherein the first PBS film is arranged such the optic axis points in a direction that is approximately 45° relative to the propagation axis and approximately 45° relative to a third axis that is perpendicular to both the propagation and deflection axes, and wherein the second PBS film is arranged such the optic axis points in a direction that is approximately 45° relative to the propagation axis and approximately 135° relative to the third axis.

18. The device of claim 1, wherein the elements of the optical device are dimensioned so as to allow for coupling of an N×M array of optical fiber ports on each of the first and second PBS films.

19. The device of claim 1, wherein the elements of the device are dimensioned such that the center-to-center spacing of port coupling regions on each of the first and second PBS films is between about 100 μm and about 400 μm.

20. The device of claim 19, wherein the elements of the device are dimensioned such that the center-to-center spacing of port coupling regions on each of the first and second PBS films is approximately 250 μm.

21. The device of claim 1, wherein each of the first and second PBS films is deposited using a source material selected from the group consisting of Silicon (Si) and Ge.

22. The device of claim 1, wherein each of the first and second polarization orientation elements includes a Faraday rotator element formed in part by depositing a magnetic garnet film on a non-magnetic substrate.

23. The device of claim 22, wherein the garnet film is deposited using liquid phase epitaxy (LPE).

24. The device of claim 22, wherein the garnet film is grown in the form: $RE1_a RE2_b Bi_{3-a-b} Fe_{5-c-d} M1_c M2_d O_{12}$, where RE1 and RE2 are each selected from the group consisting of La, Pr, Nd, Sm, Eu, Gd, Tb, Dy, Ho, Yb, and Lu, and wherein M1 and M2 are each selected from the group consisting of Ga and Al.

25. The device of claim 22, wherein each of the first and second Faraday rotator elements have periodically reversed magnetic domains arranged such that the states of polarization of the two parallel light beams of an optical signal are rotated in opposite directions.

26. The device of claim 22, wherein each of the first and second Faraday rotator elements have a substantially uniform magnetic profile such that the states of polarization of the two parallel light beams of an optical signal are rotated in the same direction.

27. The device of claim 22, wherein each of the first and second polarization orientation elements further includes a waveplate film formed by depositing a bi-layer film on the respective Faraday rotator element.

28. The device of claim 27, wherein the thickness of each waveplate film along the propagation axis is between about 5 μm and about 20 μm.

29. The device of claim 27, wherein one or more portions of each of the first and second waveplate films have been removed, and wherein each of the first and second waveplate films are arranged such that the state of polarization of only one of the two parallel light beams of an optical signal is rotated by each waveplate film.

30. The device of claim 1, wherein the thickness of each PBS film along the propagation axis is between about 0.25 mm and about 0.5 mm.

31. The device of claim 22, wherein each of the first and second polarization orientation elements further includes a waveplate film deposited on the respective Faraday rotator, wherein each of the first and second waveplate films has two or more oppositely oriented regions arranged such that the states of polarization of the two parallel light beams of an optical signal are rotated in opposite directions.

32. An optical device for coupling an array of optical fiber ports, the device comprising:

a birefringent element arranged so that light traveling parallel to a propagation axis and having a first linear polarization orientation passes through parallel to the propagation axis, and light traveling parallel to the propagation axis and having a second linear polarization orientation perpendicular to the first polarization orientation is deflected at an angle relative to the propagation axis;

first and second polarization orientation elements coupled to opposite ends of the birefringent element;

a polarization beam splitting (PBS) film deposited on said first polarization orientation element, wherein the end face of the PBS film opposite the first polarization orientation element defines an array of two or more port coupling regions for coupling light signals from an array of two or more optical fiber ports, wherein the PBS film is dimensioned and arranged so as to split a light signal in a forward direction into two parallel beams of light linearly polarized perpendicular to each other, and to combine parallel beams of light linearly polarized perpendicularly to each other in the reverse direction into a single beam of light; and a reflection element coupled to the second polarization orientation element opposite the birefringent element, wherein the reflection element is arranged such that the beam components of a light signal propagating in the forward direction are reflected back in the reverse direction;

wherein the first polarization orientation element is arranged with respect to the birefringent element and the PBS film so as to orient the polarization of both of the parallel light beams of a first optical signal propagating along a forward direction from a first port coupling region parallel to the second linear polarization orientation so that both beams are simultaneously deflected in the birefringent element, and to orient the polarization of two beams linearly polarized parallel to each other propagating in the reverse direction so that they are polarized perpendicular to each other; and wherein the second polarization orientation element refracts the light deflected by the birefringent element parallel to the propagation axis, rotates the polarization state of each of the parallel light beams of the first optical signal propagating along the forward direction by 45° in one direction, and rotates, by 45° in the same direction, the polarization state of the parallel light beams of the first optical signal propagating along the reverse direction after being reflected by the reflection element such that both beams are parallel to the first linear polarization orientation, and such that both beams simultaneously pass through the birefringent element parallel to the propagation axis in the reverse direction;

whereby the first optical signal passes from the first port coupling region to a second port coupling region.

33. The device of claim 32, wherein the birefringent element is a spatial walk-off polarizer (SWP) crystal.

34. The device of claim 32, wherein the birefringent element is a spatial walk-off polarizer (SWP) made by thin film deposition with a tilted substrate assembly.

35. The device of claim 32, wherein the first polarization orientation element consists of a periodically poled Faraday rotator element having periodically reversed magnetic domains arranged such that the states of polarization of the two parallel light beams of an optical signal are rotated in opposite directions.

36. The device of claim 35, wherein the birefringent element is oriented so that deflected light having the second linear polarization orientation has a deflection component along a deflection axis perpendicular to the propagation axis, and wherein the first PBS film is arranged such that the optic axis points in a direction that is approximately 45° relative to the propagation axis and approximately 45° relative to a third axis that is perpendicular to both the propagation and deflection axes.

37. The device of claim 32, wherein the first polarization orientation element includes a Faraday rotator element and a bi-layer waveplate film deposited thereon.

38. The device of claim 37, wherein the birefringent element is oriented so that deflected light having the second linear polarization orientation has a deflection component along a deflection axis perpendicular to the propagation axis, wherein the PBS film is arranged such the optic axis points in a direction that is approximately 45° relative to the propagation axis and approximately 45° relative to a third axis that is perpendicular to both the propagation and deflection axes.

39. The device of claim 37, wherein the first Faraday rotator elements has periodically reversed magnetic domains and is arranged such that the states of polarization of the two parallel light beams of an optical signal are rotated in opposite directions.

40. The device of claim 39, wherein the birefringent element is oriented so that deflected light having the second linear polarization orientation has a deflection component along a deflection axis perpendicular to the propagation axis, and wherein the PBS film is arranged such that the optic axis points in a direction that is approximately 45° relative to the propagation axis and parallel to the plane defined by both the propagation and deflection axes.

41. The device of claim 37, wherein the first Faraday rotator element is uniformly poled such that the states of polarization of the two parallel light beams of an optical signal are rotated in the same direction, wherein one or more portions of the first waveplate film has been removed, and wherein the first waveplate film is arranged and dimensioned such that the state of polarization of only one of the two parallel light beams of an optical signal is rotated.

42. The device of claim 32, wherein the birefringent element is a spatial walk-off polarizer (SWP), and wherein the SWP includes a diagonal cut, such that movement of the two pieces along the diagonal cut alters the dimension of the SWP along the propagation axis.

43. The device of claim 32, wherein the elements of the optical device are dimensioned so as to allow for coupling of an N×M array of optical fiber ports on the PBS film.

44. The device of claim 32, wherein the elements of the device are dimensioned such that the center-to-center spacing of port coupling regions on the PBS film is between about 100 μm and about 400 μm.

45. The device of claim 32, wherein each of the first and second polarization orientation elements includes a Faraday rotator element formed in part by depositing a magnetic garnet film on a non-magnetic substrate.

46. The device of claim 45, wherein the first Faraday rotator element has periodically reversed magnetic domains arranged such that the states of polarization of the two parallel light beams of an optical signal are rotated in opposite directions, and wherein the second Faraday rotator element has a substantially uniform magnetic profile such that the states of polarization of the two parallel light beams of an optical signal are rotated in the same direction.

47. The device of claim 45, wherein each of the first and second Faraday rotator elements have a substantially uniform magnetic profile such that the states of polarization of the two parallel light beams of an optical signal are rotated in the same direction.

48. The device of claim 45, wherein the first polarization orientation element further includes a waveplate film formed by depositing a bi-layer film on the first Faraday rotator element.

49. The device of claim 48, wherein one or more portions of the first waveplate film has been removed, and wherein the first waveplate film is arranged such that the state of polarization of only one of the two parallel light beams of an optical signal is rotated by the first waveplate film.

50. The device of claim 32, wherein the reflection element includes a thin metallic film layer deposited on the second polarization orientation element.

51. The device of claim 32, wherein the reflection element includes one or more dielectric layers deposited on the second polarization orientation element.

52. The device of claim 45, wherein the first polarization orientation element further includes a waveplate film deposited on the first Faraday rotator, wherein the waveplate film has two or more oppositely oriented regions arranged such that the states of polarization of the two parallel light beams of an optical signal are rotated in opposite directions.

53. A method of forming an optical device for coupling arrays of optical fiber ports, the method comprising:
providing a birefringent element, wherein light traveling within the birefringent element parallel to a propagation axis and having a first linear polarization orientation passes through parallel to the propagation axis, and light traveling parallel to the propagation axis and having a second linear polarization orientation perpendicular to the first polarization orientation is deflected at an angle relative to the propagation axis; and
attaching first and second polarization beam splitting (PBS) modules on opposite ends of the birefringent element, wherein each module includes a PBS film deposited on a polarization orientation element, with said polarization orientation elements being attached to the opposite ends of the birefringent element;
wherein the end face of each of the first and second PBS films opposite the polarization orientation elements defines an array of two or more port coupling regions for coupling light signals from an array of two or more optical fiber ports, with one PBS film defining even numbered ports and the other defining odd numbered ports;
wherein the first and second PBS films are dimensioned and arranged so as to split a light signal in a forward direction into two parallel beams of light linearly polarized perpendicular to each other, and to combine parallel beams of light linearly polarized perpendicularly to each other in the reverse direction into a single beam of light;
wherein the first PBS module is arranged with respect to the birefringent element such that the first polarization orientation element orients the polarization of both of the parallel light beams of a first optical signal propagating along a forward direction from a first port coupling region on the first PBS film parallel to the first linear polarization orientation so that both beams simultaneously pass through the birefringent element parallel to the propagation axis, and such that the first polarization orientation element orients the polarization of two beams linearly polarized parallel to each other propagating in the reverse direction so that they are polarized perpendicular to each other, and wherein the first polarization orientation element refracts the light deflected by the birefringent element parallel to the propagation axis; and
wherein the second PBS module is arranged with respect to the birefringent element such that the second polarization orientation element orients the polarization of both of the parallel light beams of a second optical signal propagating along a forward direction from a second port coupling region on the second PBS film parallel to the second linear polarization orientation so that both beams are simultaneously deflected in the birefringent element, and such that the second polarization orientation element orients the polarization of two beams linearly polarized parallel to each other propagating in the reverse direction so that they are mutually perpendicular.

54. The method of claim 53, wherein the birefringent element is a spatial walk-off polarizer SWP.

55. The method of claim 54, further comprising cutting the SWP from a birefringent crystal.

56. The method of claim 55, wherein the birefringent crystal is selected from the group consisting of rutile, calcite, $LiNbO_3$ and $YVO_4$.

57. The method of claim 54, wherein the SWP is a SWP film, the method further comprising forming the SWP film by thin film deposition in a tilted substrate assembly apparatus.

58. The method of claim 57, wherein the thickness of the SWP film along the propagation axis is between about 0.5 mm and about 1.0 mm.

59. The method of claim 53, wherein each of the first and second polarization orientation element includes a Faraday rotator element.

60. The method of claim 59, further including forming at least one of the first and second Faraday rotator elements by:
depositing a magnetic garnet film on a non-magnetic garnet substrate;
applying a substantially uniform magnetic field to the garnet film; and
removing the substrate, wherein the Faraday rotator element has a substantially uniform magnetic profile.

61. The method of claim 60, further comprising cutting the garnet film so as to form the first and second Faraday rotator elements, each having a substantially uniform magnetic profile.

62. The method of claim 60, further comprising periodically poling the uniformly magnetized garnet film so as to form a Faraday rotator element having periodically reversed magnetic domains.

63. The method of claim 62, further comprising cutting the garnet film so as to form the first and second Faraday rotator elements, each having periodically reversed magnetic domains.

64. The method of claim 60, further including forming at least one of the first and second PBS modules by depositing a PBS film on the Faraday rotator element.

65. The method of claim 60, wherein the thickness of the PBS film is between about 0.25 mm and about 0.5 mm.

66. The method of claim 60, wherein the thickness of the garnet film is between about 0.5 mm and about 0.7 mm.

67. The method of claim 59, wherein each polarization orientation element also includes a waveplate film, the method further comprising forming at least one of the first and second polarization orientation elements by:

depositing a magnetic garnet film on a non-magnetic garnet substrate;

applying a substantially uniform magnetic field to the garnet film so as to form a Faraday rotator element having a substantially uniform magnetic profile; and depositing a bi-layer waveplate film on the magnetized garnet film so as to form a polarization orientation element; and removing the substrate.

68. The method of claim 67, further comprising cutting the formed polarization orientation element so as to form both the first and second polarization orientation elements.

69. The method of claim 67, wherein removing the substrate is performed prior to depositing the waveplate film.

70. The method of claim 67, wherein removing the substrate is performed prior to applying the magnetic field to the garnet film.

71. The method of claim 67, further including forming at least one of the first and second PBS modules by depositing a PBS film on the polarization orientation element.

72. The method of claim 71, wherein the PBS film is deposited on the waveplate film opposite the Faraday rotator element.

73. The method of claim 71, wherein the PBS film is deposited on the Faraday rotator element opposite the waveplate film.

74. The method of claim 71, wherein the thickness of the PBS film is between about 0.25 mm and about 0.5 mm.

75. The method of claim 71, wherein the thickness of the PBS film is between about 5 μm and about 20 μm.

76. The method of claim 67, further comprising removing one or more portions of the waveplate film.

77. A method of forming an optical device for coupling an array of three or more optical fiber ports, the method comprising:

providing a birefringent element, wherein light traveling within the birefringent element parallel to a propagation axis and having a first linear polarization orientation passes through parallel to the propagation axis, and light traveling parallel to the propagation axis and having a second linear polarization orientation perpendicular to the first polarization orientation is deflected at an angle relative to the propagation axis; and attaching a polarization beam splitting (PBS) module on one end of the birefringent element, wherein the PBS module includes a PBS film deposited on a polarization orientation element, wherein the end face of the PBS film opposite the polarization orientation element defines an array of three or more port coupling regions for coupling light signals from an array of three or more optical fiber ports, and wherein the PBS film is dimensioned and arranged so as to split a light signal in a forward direction into two parallel beams of light linearly polarized perpendicular to each other, and to combine parallel beams of light linearly polarized perpendicularly to each other in the reverse direction into a single beam of light; and attaching a reflection module on the other end of the birefringent element opposite the PBS module, wherein the reflection module includes a reflection element coupled to a Faraday rotator element;

wherein the PBS module is arranged with respect to the birefringent element such that the polarization orientation element orients the polarization of both of the parallel light beams of an optical signal propagating along a forward direction from a first port coupling region on the PBS film parallel to the second linear polarization orientation so that both beams are simultaneously deflected in the birefringent element, and such that the polarization orientation element orients the polarization of two beams linearly polarized parallel to each other propagating in the reverse direction so that they are polarized perpendicular to each other; and wherein the reflection module is arranged with respect to the birefringent element such that the Faraday rotator element rotates the polarization of both of the parallel light beams of the optical signal propagating along the forward direction by 45° in one direction and rotates, by 45° in the same direction, the polarization state of both of the parallel light beams of the optical signal propagating along the reverse direction after reflection by the reflection element such that both beams are parallel to the first linear polarization orientation, and such that both beams simultaneously pass through the birefringent element parallel to the propagation axis in the reverse direction.

78. The method of claim 77, wherein the birefringent element is one of a spatial walk-off polarizer (SWP) cut from a birefringent crystal and a SWP film.

79. The method of claim 77, wherein the polarization orientation element includes a Faraday rotator element formed by:

depositing a magnetic garnet film on a non-magnetic garnet substrate;

applying a substantially uniform magnetic field to the garnet film; and removing the substrate, wherein the Faraday rotator element has a substantially uniform magnetic profile.

80. The method of claim 79, further comprising periodically poling the uniformly magnetized garnet film so as to form a Faraday rotator element having two or more periodically reversed magnetic domains.

81. The method of claim 79, further comprising depositing a PBS film on the magnetized garnet film so as to form the PBS module.

82. The method of claim 77, wherein the polarization orientation element also includes a Faraday rotator element and a waveplate film, the method further comprising forming the polarization orientation element by:

depositing a magnetic garnet film on a non-magnetic garnet substrate;

applying a substantially uniform magnetic field to the garnet film so as to form a Faraday rotator element having a substantially uniform magnetic profile; and depositing a bi-layer waveplate film on the magnetized garnet film so as to form a polarization orientation element; and removing the substrate.

83. The method of claim 82, wherein removing the substrate is performed prior to applying the magnetic field to the garnet.

84. The method of claim 82, wherein removing the substrate is performed prior to depositing the waveplate film.

85. The method of claim 82, further comprising forming the PBS module by depositing a PBS film on the Faraday rotator element opposite the waveplate film.

86. The method of claim 82, further comprising forming the PBS module by depositing a PBS film on the waveplate film opposite the Faraday rotator element.

87. The method of claim 77, wherein the reflection element includes one or more dielectric layers deposited on the Faraday rotator element.

88. The method of claim 77, wherein the reflection element includes a thin metallic film deposited on the Faraday rotator element.

* * * * *